(12) United States Patent
Trikha et al.

(10) Patent No.: US 11,487,303 B2
(45) Date of Patent: Nov. 1, 2022

(54) VALVE ASSEMBLY WITH INTEGRATED FLOW SENSOR CONTROLLER

(71) Applicant: Johnson Controls Technology Company, Auburn Hills, MI (US)

(72) Inventors: Dinesh Trikha, Shorewood, WI (US); Homero L. Noboa, Waukesha, WI (US); Hunter R. Hobgood, Franklin, WI (US); Camille M. Aucoin, Milwaukee, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 130 days.

(21) Appl. No.: 16/735,528

(22) Filed: Jan. 6, 2020

(65) Prior Publication Data
US 2021/0208611 A1 Jul. 8, 2021

(51) Int. Cl.
| | |
|---|---|
| F16K 31/02 | (2006.01) |
| G05D 7/01 | (2006.01) |
| F24F 11/63 | (2018.01) |
| F24F 11/74 | (2018.01) |
| F16K 37/00 | (2006.01) |
| G01F 25/10 | (2022.01) |

(Continued)

(52) U.S. Cl.
CPC ........ G05D 7/0113 (2013.01); F16K 37/0091 (2013.01); F24F 11/63 (2018.01); F24F 11/74 (2018.01); G01F 1/00 (2013.01); G01F 25/10 (2022.01); G05D 7/0635 (2013.01)

(58) Field of Classification Search
CPC ..... G05D 7/0113; G05D 7/0635; F24F 11/63; F24F 11/74; F16K 37/0091; G01F 1/00; G01F 25/10

USPC .............................................. 137/511, 487.5
See application file for complete search history.

(56) References Cited

U.S. PATENT DOCUMENTS

| | | | |
|---|---|---|---|
| 6,892,745 B2 | 5/2005 | Benson | |
| 9,746,199 B1 | 8/2017 | Drees et al. | |

(Continued)

FOREIGN PATENT DOCUMENTS

GB  2 520 479 A  5/2015

OTHER PUBLICATIONS

U.S. Appl. No. 16/115,508, filed Aug. 28, 2018, Johnson Controls Technology Company.

(Continued)

*Primary Examiner* — Minh Q Le
(74) *Attorney, Agent, or Firm* — Foley & Lardner LLP

(57) ABSTRACT

An actuator of an environmental control system of a building including a motor and a drive device driven by the motor and configured to drive a valve within a range of positions. The actuator includes one or more printed circuit boards including one or more processing circuits configured to obtain a raw measurement data set from transducers and generate a flow signal based on the raw measurement data set. The flow signal indicates a flow rate of a fluid through a conduit. The one or more processing circuits are configured to determine an actuator position setpoint based on a flow rate setpoint and the flow signal and operate the motor to drive the drive device to the actuator position setpoint. The motor, the drive device, and the one or more printed circuit boards are located within a common device chassis.

19 Claims, 15 Drawing Sheets

(51) Int. Cl.
*G01F 1/00* (2022.01)
*G05D 7/06* (2006.01)

(56) References Cited

U.S. PATENT DOCUMENTS

| | | | | |
|---|---|---|---|---|
| 2001/0003286 A1* | 6/2001 | Philippbar | | G01M 3/243 |
| | | | | 137/624.12 |
| 2008/0099069 A1* | 5/2008 | Cook | | F16K 31/02 |
| | | | | 137/14 |
| 2011/0105012 A1* | 5/2011 | Niederhauser | | F24F 11/74 |
| | | | | 454/239 |
| 2013/0220980 A1* | 8/2013 | Salsich | | F16K 31/0675 |
| | | | | 219/121.39 |
| 2014/0230925 A1* | 8/2014 | Halimi | | G05D 7/0635 |
| | | | | 137/487.5 |
| 2015/0378370 A1* | 12/2015 | Maichl | | F15B 13/0857 |
| | | | | 137/487.5 |
| 2017/0212482 A1* | 7/2017 | Boettcher | | F24F 11/62 |
| 2017/0295058 A1 | 10/2017 | Gottschalk et al. | | |
| 2018/0187909 A1 | 7/2018 | Drees et al. | | |
| 2018/0238577 A1 | 8/2018 | Drees et al. | | |
| 2018/0239371 A1 | 8/2018 | Drees et al. | | |
| 2019/0018432 A1 | 1/2019 | Petry | | |
| 2019/0331123 A1* | 10/2019 | Yang | | F24F 11/30 |
| 2019/0353385 A1* | 11/2019 | Aucoin | | F16K 37/0091 |
| 2020/0132331 A1* | 4/2020 | Wilson | | F24F 11/77 |
| 2020/0196485 A1* | 6/2020 | Park | | B60H 1/00021 |
| 2021/0172632 A1* | 6/2021 | Saunders | | F24F 11/65 |

OTHER PUBLICATIONS

U.S. Appl. No. 16/447,783, filed Jun. 20, 2019, Johnson Controls Technology Company.
U.S. Appl. No. 16/447,813, filed Jun. 20, 2019, Johnson Controls Technology Company.

* cited by examiner

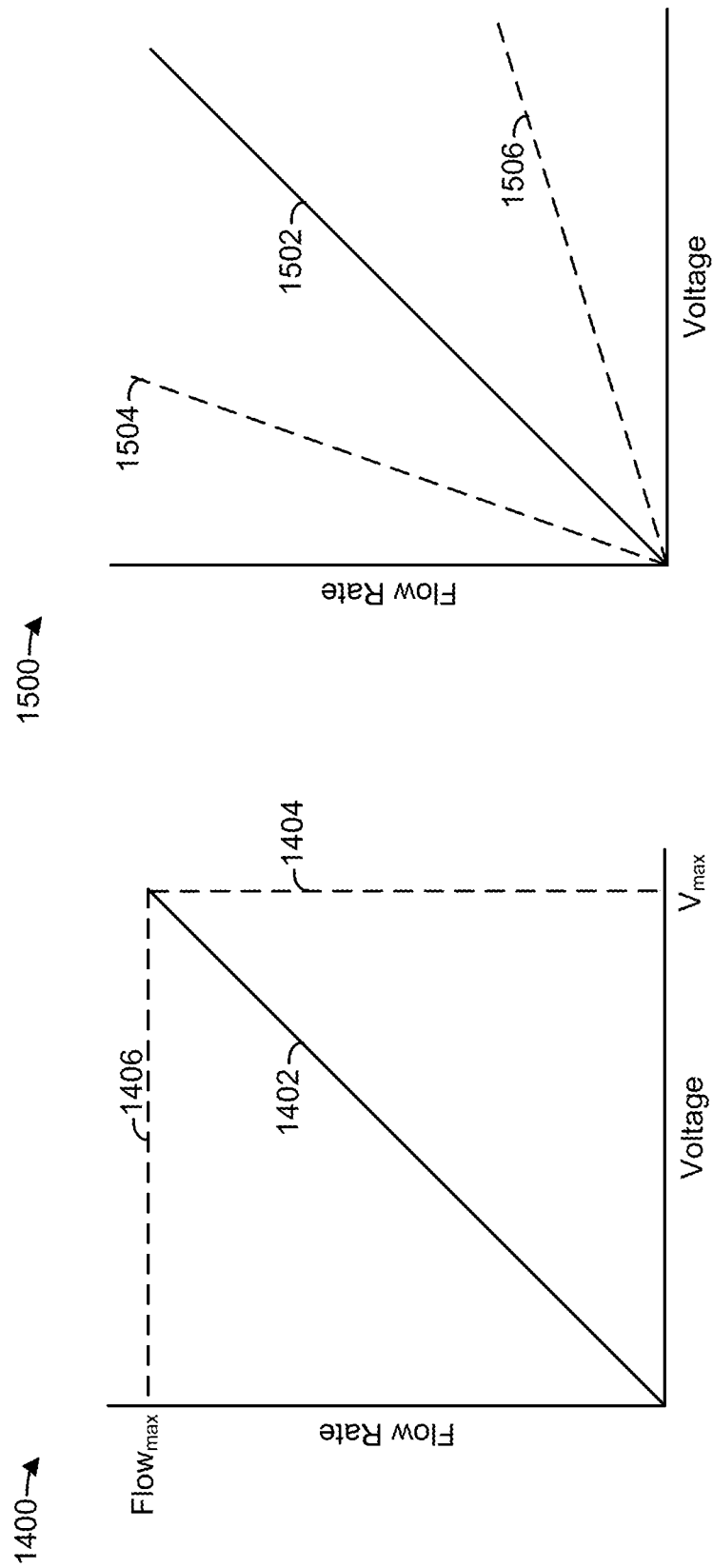

VALVE ASSEMBLY WITH INTEGRATED FLOW SENSOR CONTROLLER

BACKGROUND

The present disclosure relates generally to the field of building management system and associated devices and more particularly to the hardware and systems used for controlling fluid flow in a pressure disturbance rejection valve assembly. A pressure disturbance rejection valve assembly includes an onboard electronic controller that is agnostic to system pressure fluctuations. Instead the pressure disturbance rejection valve assembly controls a valve position based on a flow command received from an external device and a flow rate internally determined using a physical measurement from a plurality of transducers.

As building management systems (BMS) become more and more integrated to handle various faults and changing conditions throughout a building, it becomes convenient to create a multi-functional device. By creating a device that allows the user to install one all-encompassing device instead of at least five separate devices (e.g., a transducer, a plurality of processing circuits, an actuator, and a valve) the user saves time and money. It is therefore advantageous to create a pressure disturbance rejection valve assembly that can detect a flow rate, receive an external flow setpoint, and respond to changing conditions in the building.

SUMMARY

One implementation of the present disclosure is an actuator of an environmental control system of a building, according to some embodiments. The actuator includes a motor, according to some embodiments. The actuator includes a drive device driven by the motor and configured to drive a control device within a range of positions, according to some embodiments. The actuator includes a printed circuit board including one or more processing circuits, according to some embodiments. The one or more processing circuits are configured to obtain a raw measurement data set from one or more transducers, according to some embodiments. The one or more processing circuits are configured to generate a flow signal based on the raw measurement data set, according to some embodiments. The flow signal indicates a flow rate of a fluid through a conduit, according to some embodiments. The one or more processing circuits are configured to determine an actuator position setpoint based on a flow rate setpoint and the flow signal, according to some embodiments. The one or more processing circuits are configured to operate the motor to drive the drive device to the actuator position setpoint, according to some embodiments. The motor, the drive device, and the printed circuit board are located within a common device chassis, according to some embodiments.

In some embodiments, the actuator includes a communications circuit. The communications circuit is configured to receive the flow rate setpoint from an external device, according to some embodiments. The communications circuit is configured to provide the flow rate setpoint to the one or more processing circuits, according to some embodiments.

In some embodiments, the one or more processing circuits are configured to determine calibration settings of the one or more transducers. The calibration settings indicate one or more relationships between an output signal of the one or more transducers and the raw measurement data set, according to some embodiments. The flow signal is generated based on the calibration settings, according to some embodiments.

In some embodiments, the one or more transducers are configured to provide an output signal directly indicative of a received signal on the one or more transducers.

In some embodiments, the one or more processing circuits are configured to generate processed data by performing one or more manipulations of the raw measurement data set. The flow signal is generated based on the processed data, according to some embodiments.

In some embodiments, the one or more processing circuits are configured to receive a feedback signal indicating an operating status of the motor. The one or more processing circuits are configured to determine if the operating status of the motor is within a range of expected values, according to some embodiments. The one or more processing circuits are configured to, in response to a determination that the operating status of the motor is not within the range of expected values, initiate a corrective action, according to some embodiments.

In some embodiments, the one or more processing circuits are configured to select an equation for generating the flow signal based on at least one of a type of the one or more transducers, calibration settings of the one or more transducers, or a format of raw measurements of the raw measurement data set. The flow signal is generated based on the selected equation, according to some embodiments.

Another implementation of the present disclosure is an environmental control system of a building, according to some embodiments. The environmental control system includes an actuator, according to some embodiments. The actuator includes a motor, according to some embodiments. The actuator includes a drive device driven by the motor and configured to drive a control device within a range of positions, according to some embodiments. The environmental control system includes a first printed circuit board including a first processing circuit, according to some embodiments. The first processing circuit is configured to obtain a raw measurement data set from one or more transducers, according to some embodiments. The first processing circuit is configured to generate a flow signal based on the raw measurement data set, according to some embodiments. The flow signal indicates a flow rate of a fluid through a conduit, according to some embodiments. The environmental control system includes a second printed circuit board including a second processing circuit, according to some embodiments. The second processing circuit is configured to determine an actuator position setpoint based on a flow rate setpoint and the flow signal, according to some embodiments. The second processing circuit is configured to operate the motor to drive the drive device to the actuator position setpoint, according to some embodiments. The motor, the drive device, the first printed circuit board, and the second printed circuit board are located within a single enclosure, according to some embodiments.

In some embodiments, the environmental control system includes a communications circuit. The communications circuit is configured to receive the flow rate setpoint from an external device, according to some embodiments. The communications circuit is configured to provide the flow rate setpoint to at least one of the first processing circuit or the second processing circuit, according to some embodiments.

In some embodiments, the first processing circuit is configured to determine calibration settings of the one or more transducers, according to some embodiments. The calibration settings indicate one or more relationships between an output signal of the one or more transducers and the raw measurement data set, according to some embodiments. The flow signal is generated based on the calibration settings, according to some embodiments.

In some embodiments, the one or more transducers are configured to provide an output signal directly indicative of a received signal on the one or more transducers.

In some embodiments, the first processing circuit is configured to generate processed data by performing one or more manipulations of the raw measurement data set. The flow signal is generated based on the processed data, according to some embodiments.

In some embodiments, the second processing circuit is configured to receive a feedback signal indicating an operating status of the motor. The one or more processing circuits are configured to determine if the operating status of the motor is within a range of expected values, according to some embodiments. The one or more processing circuits are configured to, in response to a determination that the operating status of the motor is not within the range of expected values, initiate a corrective action, according to some embodiments.

In some embodiments, the first processing circuit is configured to select an equation for generating the flow signal based on at least one of a type of the one or more transducers, calibration settings of the one or more transducers, or a format of raw measurements of the raw measurement data set, according to some embodiments. The flow signal is generated based on the selected equation, according to some embodiments.

Another implementation of the present disclosure is a method for operating a motor of an actuator, according to some embodiments. The method includes obtaining, by one or more processing circuits of a printed circuit board, a raw measurement data set from one or more transducers, according to some embodiments. The method includes generating, by the one or more processing circuits, a flow signal based on the raw measurement data set, according to some embodiments. The flow signal indicates a flow rate of a fluid through a conduit, according to some embodiments. The method includes determining, by the one or more processing circuits, an actuator position setpoint based on a flow rate setpoint and the flow signal, according to some embodiments. The method includes operating, by the one or more processing circuits, a motor of the actuator to drive a drive device of the actuator to the actuator position setpoint, according to some embodiments. The motor, the drive device, and the printed circuit board are located within a common device chassis, according to some embodiments.

In some embodiments, the method includes receiving, by a communications interface, the flow rate setpoint from an external device. The method includes providing, by the communications interface, the flow rate setpoint to at least one of the first processing circuit or the second processing circuit, according to some embodiments.

In some embodiments, the method includes determining, by the one or more processing circuits, calibration settings of the one or more transducers, according to some embodiments. The calibration settings indicate one or more relationships between an output signal of the one or more transducers and the raw measurement data set, according to some embodiments. The flow signal is generated based on the calibration settings, according to some embodiments.

In some embodiments, the one or more transducers are configured to provide an output signal directly indicative of a received signal on the one or more transducers.

In some embodiments, the method includes generating, by the one or more processing circuits, processed data by performing one or more manipulations of the raw measurement data set. The flow signal is generated based on the processed data, according to some embodiments.

In some embodiments, the method includes receiving, by the one or more processing circuits, a feedback signal indicating an operating status of the motor. The method includes determining, by the one or more processing circuits, if the operating status of the motor is within a range of expected values, according to some embodiments. The method includes, in response to a determination that the operating status of the motor is not within the range of expected values, initiating, by the one or more processing circuits, a corrective action, according to some embodiments.

In some embodiments, the method includes selecting, by the one or more processing circuits, an equation for generating the flow signal based on at least one of a type of the one or more transducers, calibration settings of the one or more transducers, or a format of raw measurements of the raw measurement data set. The flow signal is generated based on the selected equation, according to some embodiments.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 14 is a graph illustrating a relationship between voltage and flow rate generated by a traditional sensor, according to some embodiments.

FIG. 15 is a graph illustrating various relationships between voltage and flow rate associated with transducer outputs, according to some embodiments.

DETAILED DESCRIPTION

Overview

Figure 1:
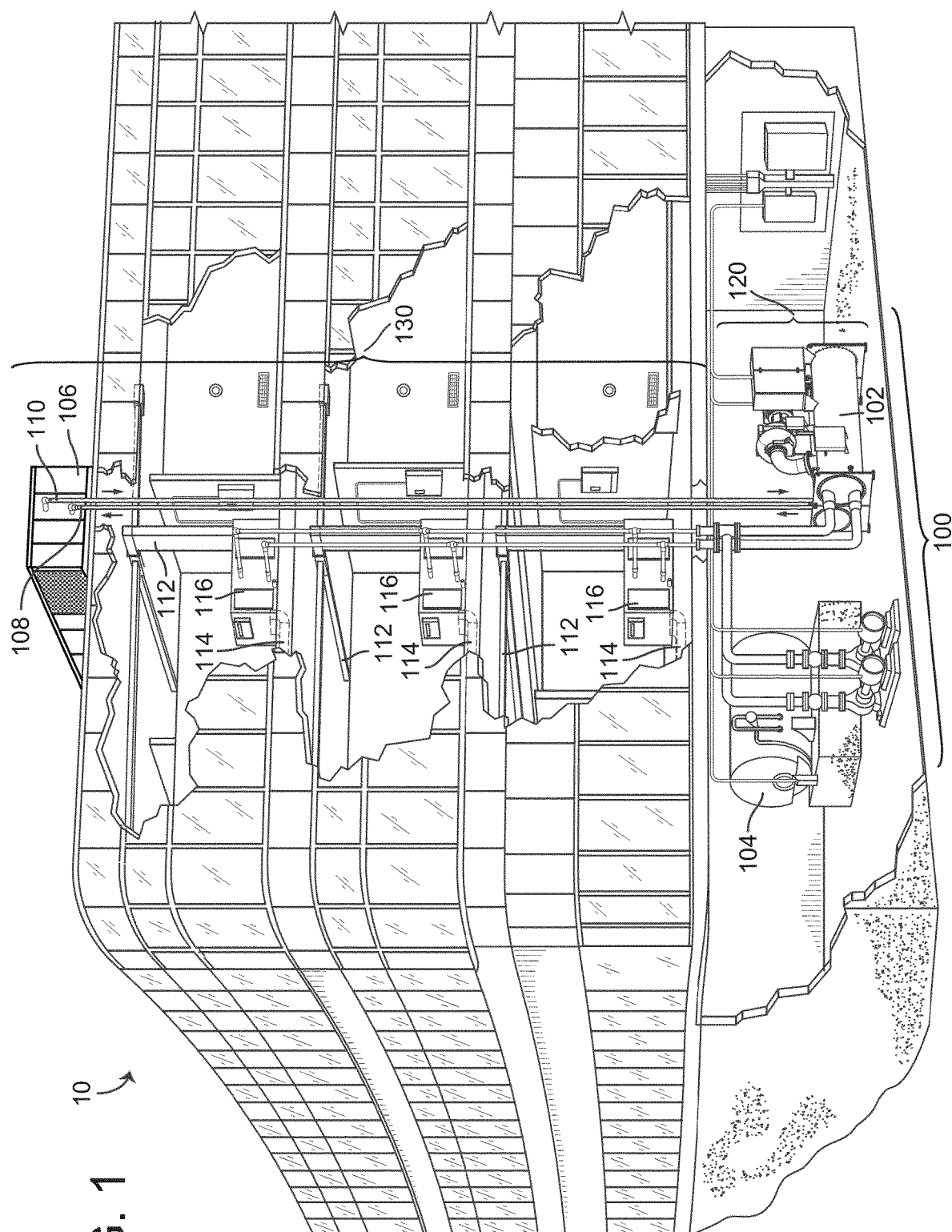
FIG. 1 is a drawing of a building equipped with a heating, ventilating, or air conditioning (HVAC) system and a building management system (BMS), according to some embodiments.

Before turning to the FIGURES, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the FIGURES, various systems for controlling fluid flow in a pressure disturbance rejection valve assembly are shown, according to some embodiments. The pressure disturbance rejection valve assembly includes, at minimum, an electronically-controlled actuator, a valve and a plurality of flow transducers. The flow transducers may include an input/output (I/O) component circuit card assembly, and a measurement circuit. The actuator may include one or more printed circuit boards. Of the plurality, at least one is a flow dedicated printed circuit board (PCB). The flow PCB may include a dedicated microcontroller with an I/O component and a processing component. Of the one or more printed circuit boards, at least one is an actuator dedicated PCB. The actuator PCB may include a dedicated microcontroller with an I/O component, a control component, and a hardware component. In operation, the flow transducers measurement circuit measures a physical property (e.g., pressure, temperature, etc.) of a fluid flowing through the valve, the I/O component circuit card assembly sends this information to the I/O component of the microcontroller on the flow PCB. The I/O component communicates this data to the processing component and the processing component calculates the flow rate of the fluid using a mathematical model of the fluid (e.g. temperature variations). The flow rate can be sent back to the I/O component of the flow PCB. The I/O component of the flow PCB then can send this data to the I/O component of the microcontroller on the actuator PCB. The I/O component of the actuator PCB receives a flow command (e.g., 0%-100%) from an external source (e.g., another controller, a building management system (BMS)) and measured flow readings from the I/O component of the microcontroller on the flow PCB. The I/O component then communicates this data to the control component, which utilizes a control technique (e.g., proportional variable deadband control (PVDC)) to determine an actuator and valve position setpoint. The control component transmits the position setpoint to the hardware component, which rotates a valve stem of the valve to reach the setpoint. The control component constantly monitors the measured flow and the flow setpoint, and adjusts the valve position accordingly in order to minimize the error between the measured flow and the flow setpoint.

The pressure disturbance reaction system includes, at minimum, a flow processing circuit, an actuator processing circuit, and a transducer. The actuator processing circuit may include an input/output (I/O) component circuit assembly, a control component circuit assembly, and a hardware component circuit assembly. The flow processing circuit may include an input/output (I/O) component circuit assembly, a control component circuit assembly, a physical output component, and a hardware component circuit assembly.

Building Management System and HVAC System

Referring now to FIGS. 1-4, an exemplary BMS and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
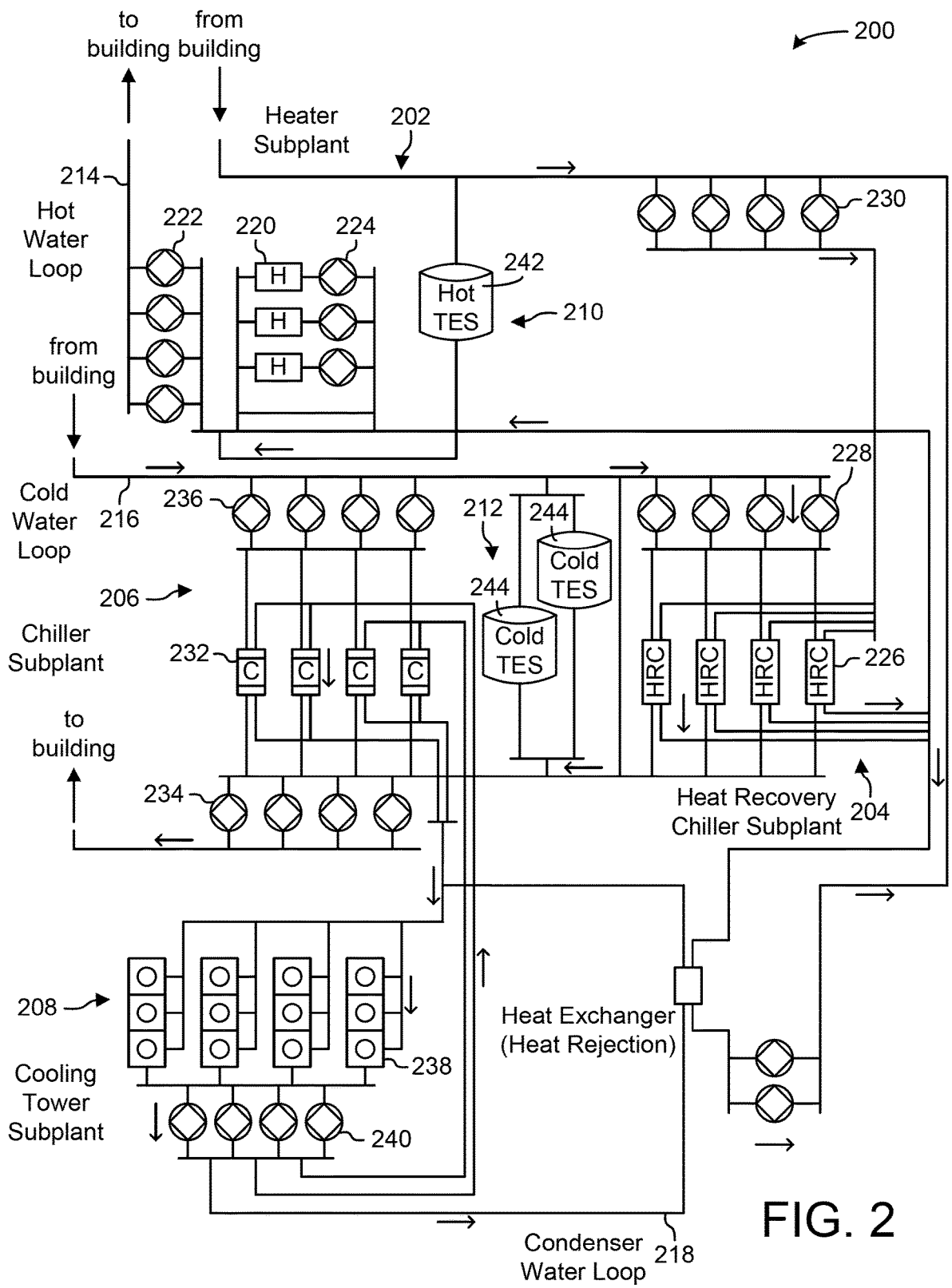
FIG. 2 is a schematic diagram of a waterside system that can be used to support the HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
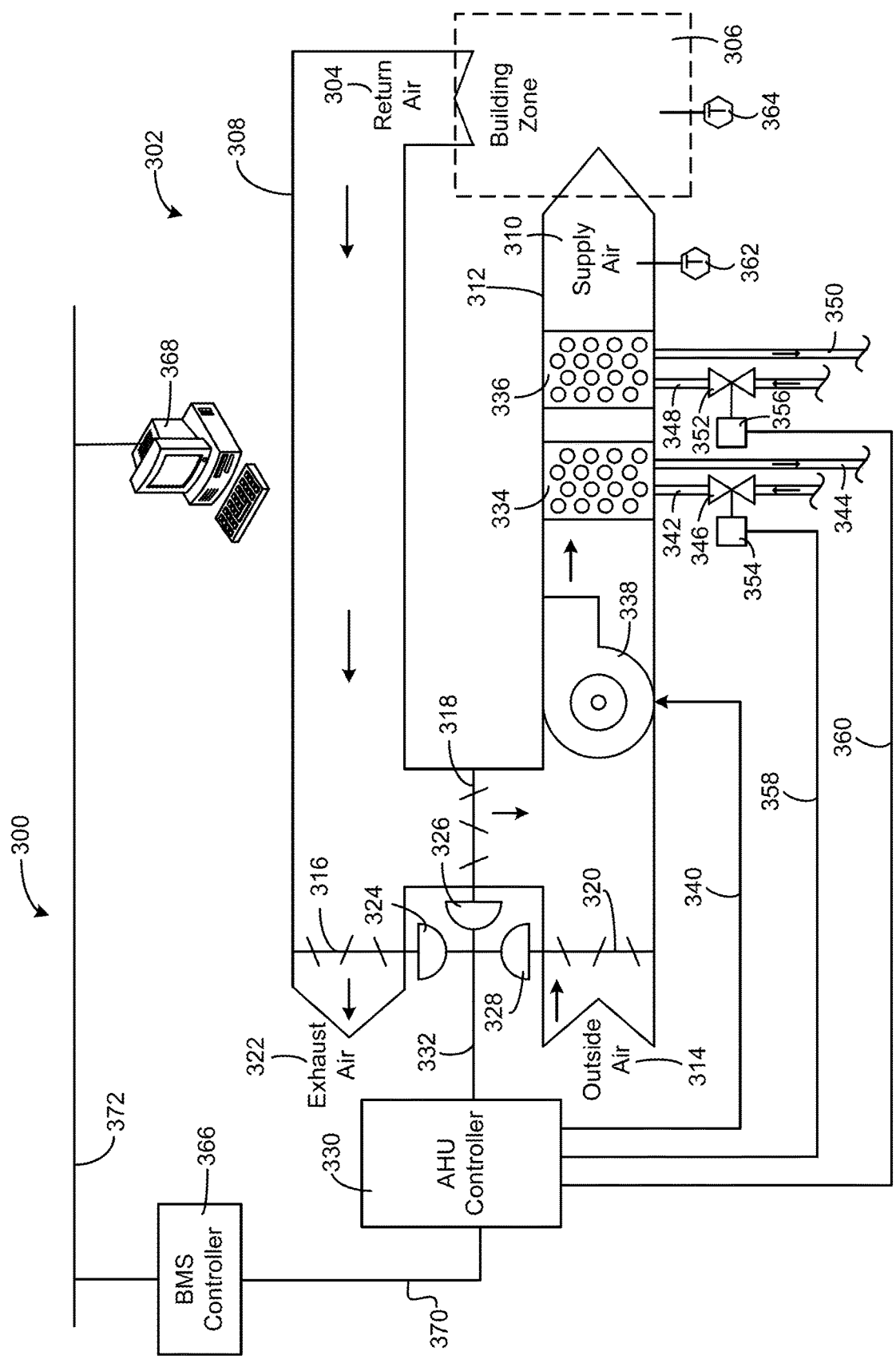
FIG. 3 is a block diagram of an airside system that can be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
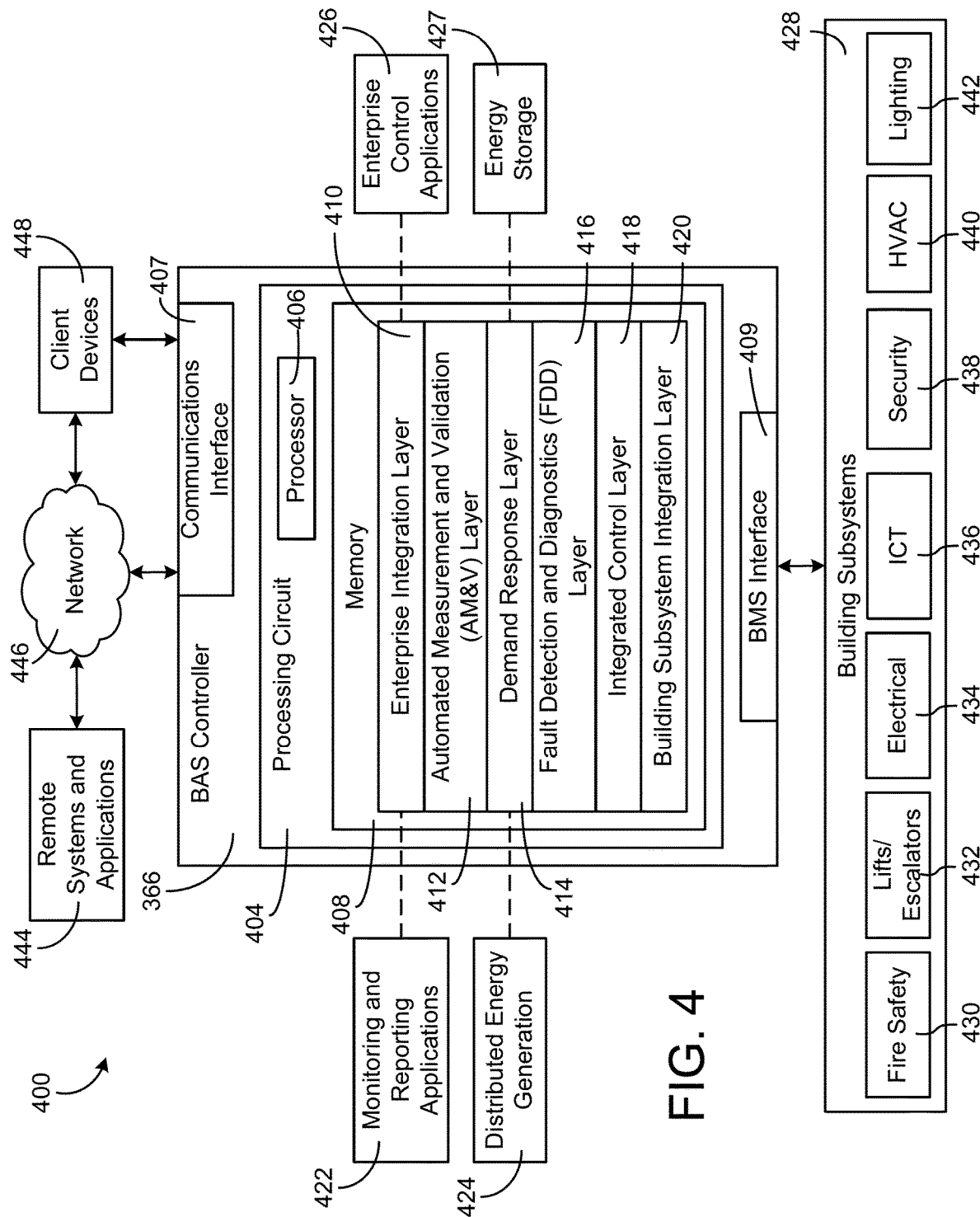
FIG. 4 is a block diagram of a BMS that can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration layer 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Pressure Disturbance Rejection Valve Assembly

Figure 5:
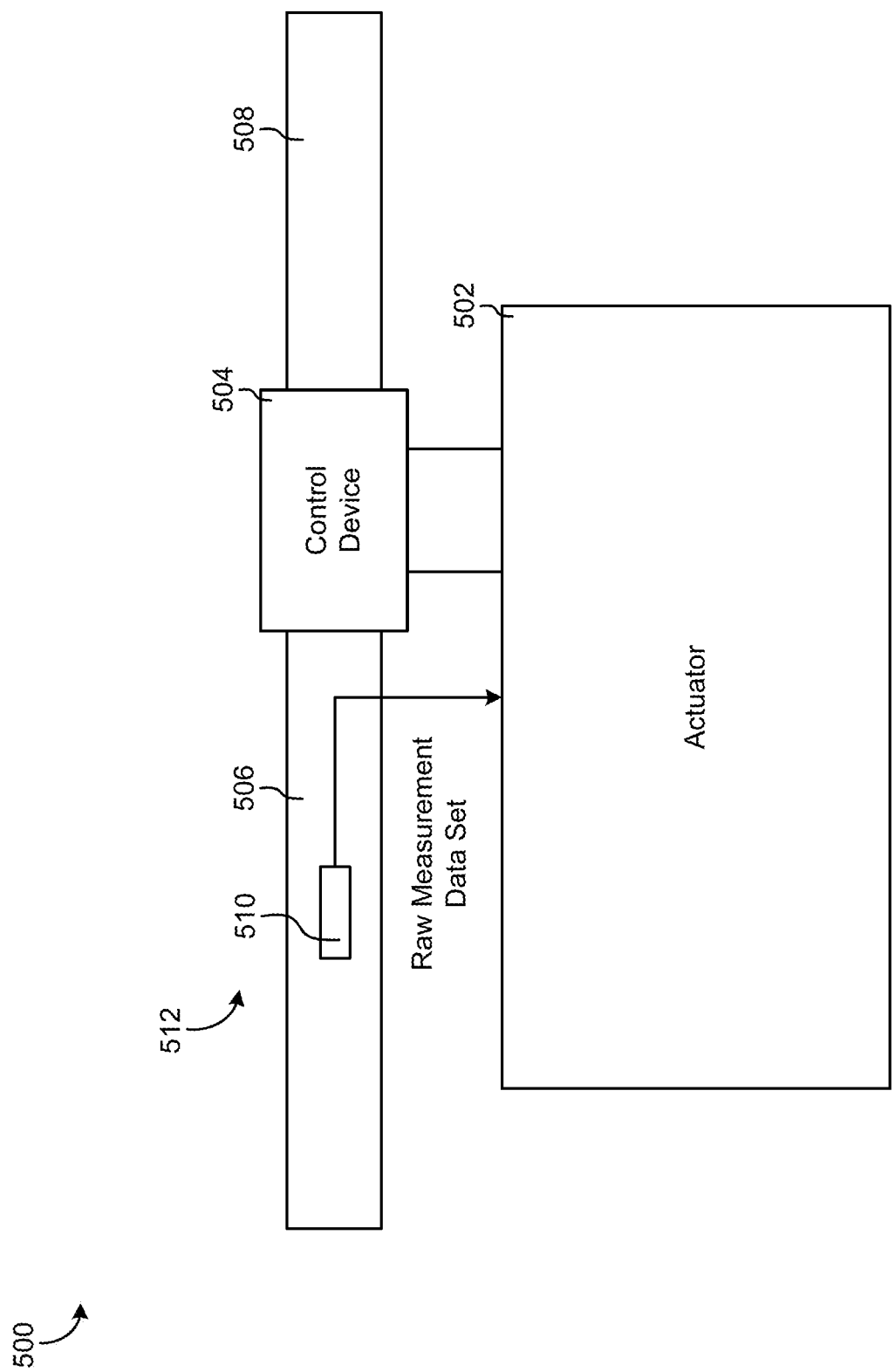
FIG. 5 is a block diagram of a pressure disturbance rejection valve assembly that can be implemented in the HVAC system of FIG. 1, according to some embodiments.

Referring now to FIG. 5, a block diagram of a pressure disturbance rejection valve assembly 500 is shown, according to some embodiments. Valve assembly 500 may be used in HVAC system 100, waterside system 200, airside system 300, or BMS 400, as described with reference to FIGS. 1-4. Valve assembly 500 is shown to include an actuator 502 coupled to a control device 504. For example, actuator 502 may be a damper actuator, a valve actuator, a fan actuator, a pump actuator, or any other type of actuator that can be used in an HVAC system or BMS. In various embodiments, actuator 502 may be a linear actuator (e.g., a linear proportional actuator), a non-linear actuator, a spring return actuator, a non-spring return actuator, a capacitive return actuator, or a non-capacitive return actuator.

Control device 504 may be any type of control device (e.g., a valve) configured to control an environmental parameter in an HVAC system, including, but not limited to, a 2-way or 3-way two position electric motorized valve, a ball isolation valve, a floating point control valve, an adjustable flow control device, or a modulating control valve. In some embodiments, control device 504 may regulate the flow of a fluid through a conduit, pipe, or tube (e.g., conduit 512) in a waterside system (e.g., waterside system 200, shown in FIG. 2). Conduit 512 may include upstream conduit section 506 and downstream conduit section 508. In other embodiments, control device 504 may regulate the flow of air through a duct in an airside system (e.g., airside system 300, shown in FIG. 3).

In some embodiments, actuator 502 and control device 504 are located within a common integrated device chassis or housing. In short, actuator 502 and control device 504 may not be packaged as separate devices, but as a single device. Reducing the number of devices in an HVAC system may provide numerous advantages, most notably in time and cost savings during the installation process. Because it is not necessary to install actuator 502 and control device 504 as separate devices and then make a connection between them, technicians performing the installation may require less specialized training and fewer tools. Other advantages of a single device may include simplification of control and troubleshooting functions. However, in some embodiments, actuator 502 and control device 504 are packaged as separate devices that may be communicably coupled via a wired or a wireless connection.

Still referring to FIG. 5, a plurality of transducers 510 are shown to be disposed within upstream conduit section 506. Transducers 510 may be configured to measure any type of physical property of the fluid passing through conduit 512, and more specifically, the fluid entering control device 504. The physical property may be but is not limited to: temperature, pressure, displacement, electric potential, resistance, electric current, light intensity, or ultrasonic time of flight. Ultrasonic time of flight is a length of time it takes for an ultrasonic wave to travel through the fluid. In some embodiments, the measurement of the physical property may be a differential measurement such that it consists of a difference between two or more measurements. Transducers 510 may be any type of device (e.g., ultrasonic transducer, paddle-wheel transducer, pitot tube, pressure transducer, piezoelectric transducer, chemical transducer, photovoltaic transducer, turbine flow transducer, vortex transducer, venturi transducer, pitot tubes, calorimetrics transducers, electromagnetic transducers, Doppler transducers, thermal transducers, Coriolis transducers, etc.) configured to collect the physical measurement using any applicable method. In some embodiments, transducers 510 are configured to provide an output signal directly indicative of a force exerted on transducers 510 by the fluid. The force exerted on transducers 510 may depend on the flow rate or flow velocity of the fluid as well as properties of the fluid such as density, viscosity, specific gravity, etc. Accordingly, additional calculations may be needed to convert the output of transducers 510 into a flow rate. In some embodiments, transducers 510 are a plurality of temperature transducers (e.g. a thermocouple) that collects measurements pertinent to the principles of King's Law. According to King's Law, the heat transfer from a heated object exposed to a moving fluid is a function of the velocity of the fluid. King's Law devices have several features, including very high sensitivity at low flow rates and measurement of the fluid temperature (which may be useful for control purposes), although they have decreased sensitivity at high flow rates.

In other embodiments, transducers 510 are a plurality of ultrasonic transducers that collect measurements pertinent to the Strouhal number. The Strouhal number is a dimensionless value useful for characterizing oscillating flow dynamics. An ultrasonic transducer measures the acoustic detection of vortices in fluid caused when the fluid flows past a cylindrically-shaped obstruction. The vibrating frequency of the vortex shedding is correlated to the flow velocity. Vortex-shedding devices have good sensitivity over a range of flow rates, although they require a minimum flow rate in order to be operational.

The plurality of transducers may be located in any location along conduit 512, including before control device 504, after control device 504, or any other location. In some embodiments, each member of the plurality may take a measurement, and the physical measurement may be made up of a plurality of measurements. In some embodiments, transducers 510 are a ring shaped plurality of transducers that wraps around conduit 512. The ring can include two or more transducers located opposite to one another. In additional embodiments, transducers 510 are a single transducer. The single transducer may be used to measure a physical property of the fluid. For example, the single transducer may be a pressure transducer (e.g., pitot tube) used to collect a differential pressure measurement.

Transducers 510 may be communicably coupled to actuator 502. For example, transducers 510 may be coupled via wired or wireless connection for the purpose of the transmission of the raw measurement data set. As defined herein, a raw measurement can described an unadjusted measurement from a transducer that may or may not be proportional to a flow rate. Specifically, raw measurements may be direct (i.e., unprocessed) measurements from transducers that do not account for fluid characteristics (e.g., density, specific gravity, etc.), configuration settings of the transducer, or other considerations that may affect an association between the raw measurements and a flow rate. In some embodiments, the raw measurement data set may be transmitted as an analog signal. Specifically, the raw measurement data set may be a set of voltage signals, current signals, etc. outputted by transducers 510.

It should be noted that transducers 510 are not a component of a sensor. Rather, transducers 510 are independent components that can output raw measurements (e.g., in the form of raw voltage or current signals) directly to actuator 502. In traditional systems, transducers 510 may be a part of a sensor (e.g., a flow sensor) that account for characteristics of a fluid to convert the raw measurements into a flow proportionate value. As described herein, a flow proportionate value can refer to a value that is proportional to flow and is determined by manipulating raw measurements from transducers based on characteristics of a fluid measured by the transducers and/or other factors that can affect interpretation of the raw measurements. For example, a flow proportionate value may be a voltage value that is calculated based on raw measurements gathered by transducers 510 and manipulated based on characteristics of a fluid (e.g., density, viscosity, specific gravity, etc.) passing through conduit 512 or other calibration data for transducers 510. These traditional systems thereby require some processing capabilities within the sensor to convert the raw measurements into the flow proportionate value. However, as shown in FIG. 5, actuator 502 can directly receive measurements from transducers 510 to calculate flow proportionate values, thus eliminating the need for complex sensors with processing components in valve assembly 500. A structure of traditional sensors and comparisons to the present application are described in detail below with reference to FIGS. 13-15.

A flow proportionate value may be directly proportional to flow rate and can be used to calculate flow rate without knowledge of any intensive properties of the fluid being measured (e.g., density, specific gravity, etc.). For example, a flow proportionate voltage signal may range from a minimum voltage $V_{min}$ (e.g., 0V, 2V, etc.) to a maximum voltage $V_{max}$ (e.g., 10V, 12V, etc.), where a value of $V_{min}$ corresponds to a minimum flow rate $Flow_{min}$ (e.g., zero flow, a non-zero minimum flow), a value of $V_{max}$ corresponds to a pre-established maximum flow rate $Flow_{max}$, and any value between $V_{min}$ and $V_{max}$ corresponds directly to a flow rate between $Flow_{min}$ and $Flow_{max}$. Conversely, a flow disproportionate value may include raw transducer measurements that are not proportional to flow rate (e.g., time of flight) or raw transducer measurements that cannot be converted to flow rate without knowledge of an intensive property of the fluid being measured.

Accordingly, it should be understood that the term "flow proportionate value" as used herein refers to any value that is proportional to the flow rate where the proportionality factor is not dependent on an intensive property of the fluid (e.g., density, specific gravity, etc). Accordingly, an actual flow rate can be calculated directly from a flow proportionate value without compensating for any fluid-specific properties. Conversely, the term "flow disproportionate value" refers to any value that is either not proportional to the flow rate (e.g., time of flight measurements) or cannot be used to calculate a flow rate without knowledge of any intensive properties of the fluid such as density, viscosity, specific gravity, and the like (e.g., measurements from a pressure transducer). Accordingly, an actual flow rate cannot be calculated directly from a flow disproportionate value without either adjusting for a fluid-specific property such as density or using an equation that amounts to more than mere multiplication or division by a fluid-independent proportionality factor.

Figure 6A:
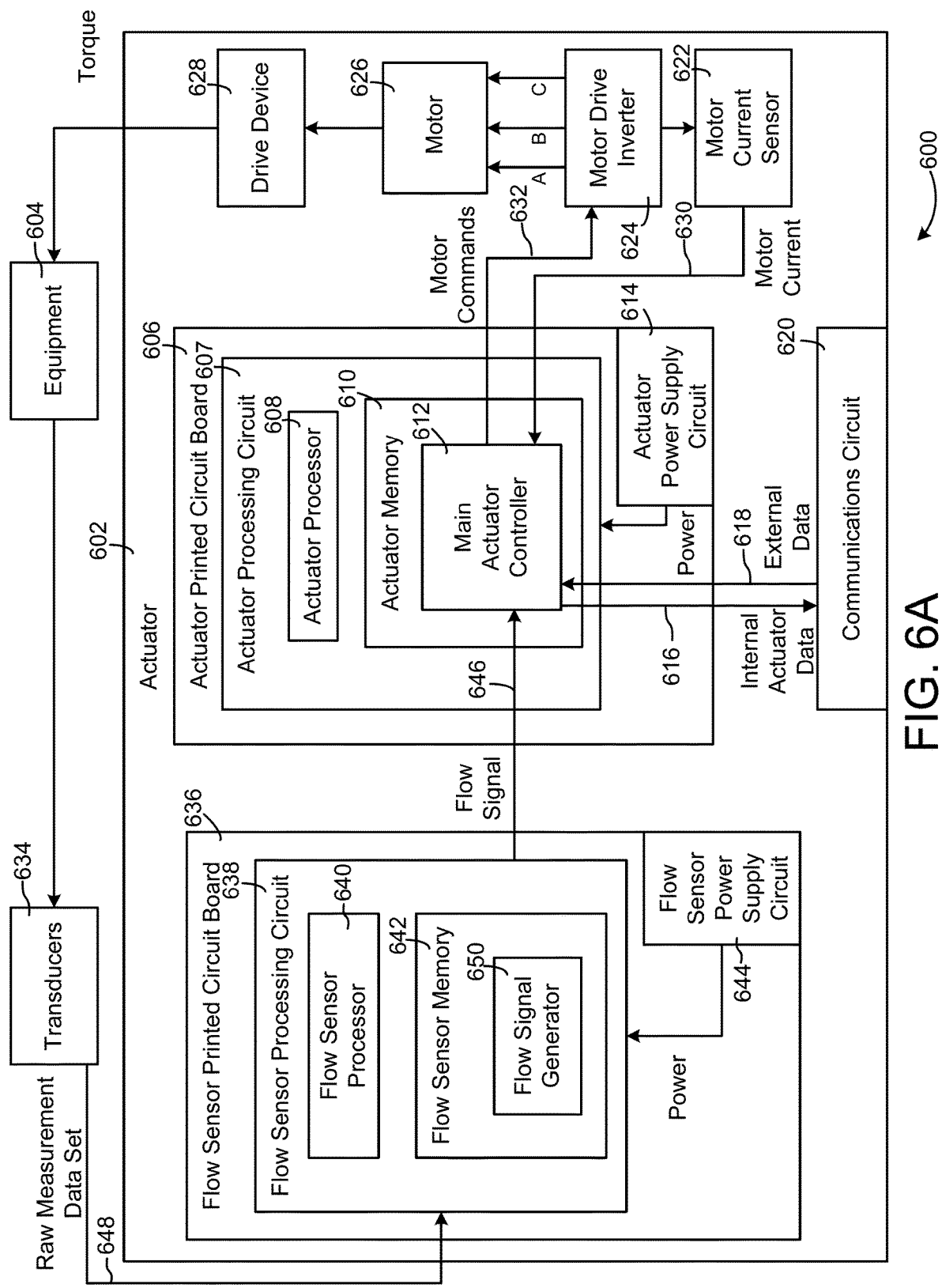
FIG. 6A is a block diagram of another pressure disturbance rejection valve assembly that can be implemented in the HVAC system of FIG. 1 using two printed circuit boards within one common device chassis, according to some embodiments.

Referring now to FIG. 6A, a block diagram of another pressure disturbance rejection valve assembly 600 is shown using two printed circuit boards within one common device chassis, according to some embodiments. Valve assembly 600 may be used in HVAC system 100, waterside system 200, airside system 300, or BMS 400, as described with reference to FIGS. 1-4. Valve assembly 600 may represent a more detailed version of valve assembly 500. For example, valve assembly 600 is shown to include actuator 602, which may be identical or substantially similar to actuator 502 in valve assembly 500. Actuator 602 may be configured to operate equipment 604. Equipment 604 may include any type of system or device that can be operated by an actuator (e.g., a valve, a damper). In an exemplary embodiment, actuator 602 and equipment 604 (e.g., a valve) are packaged within a common device chassis. In some embodiments, various circuits/circuit boards of actuator 602 (e.g., flow sensor printed circuit board 636, actuator printed circuit board 606) are included in a single printed circuit board as described in greater detail below with reference to FIG. 7A. In some embodiments, functionality of flow sensor printed circuit board 636 and actuator printed circuit board 606 are included in a single processing circuit as described in greater detail below with reference to FIG. 7B.

Actuator 602 is shown to include an actuator printed circuit board 606. Actuator printed circuit board 606 may be any sort of printed circuit board (PCB) such as a single sided PCB, a double sided PCB, a multilayer PCB, a rigid PCB, a flex PCB, a rigid-flex PCB, or two or more combinations. Actuator printed circuit board 606 is further shown to include an actuator processing circuit 607 communicably coupled to motor 626. Actuator processing circuit 607 may be any type of circuit such as an integrated circuit, a chip, or a microcontroller unit (MCU). In some embodiments, motor 626 is a brushless DC (BLDC) motor. Actuator processing circuit 607 is shown to include an actuator processor 608, actuator memory 610, and a main actuator controller 612. Actuator processor 608 can be a general purpose or specific purpose processor, an application specific integrated circuit (ASIC), one or more field programmable gate arrays (FPGAs), a group of processing components, or other suitable processing components. Actuator processor 608 can be configured to execute computer code or instructions stored in actuator memory 610 or received from other computer readable media (e.g., CDROM, network storage, a remote server, etc.)

Actuator memory 610 may include one or more devices (e.g., memory units, memory devices, storage devices, etc.) for storing data and/or computer code for completing and/or facilitating the various processes described in the present disclosure. Actuator memory 610 may include random access memory (RAM), read-only memory (ROM), hard drive storage, temporary storage, non-volatile memory, flash memory, optical memory, or any other suitable memory for storing software objects and/or computer instructions. Actuator memory 610 may include database components, object code components, script components, or any other type of information structure for supporting the various activities and information structures described in the present disclosure. Actuator memory 610 can be communicably connected to actuator processor 608 via actuator processing circuit 607 and may include computer code for executing (e.g., by actuator processor 608) one or more processes described herein. When actuator processor 608 executes instructions stored in actuator memory 610, actuator processor 608 generally configures actuator 602 (and more particularly actuator processing circuit 607) to complete such activities.

Actuator printed circuit board 606 is further shown to include an actuator power supply circuit 614. Actuator power supply circuit 614 may be an unregulated power supply, a linear regulated power supply, a switching power supply, or a ripple regulated power supply. In some embodiments, actuator power supply circuit 614 is a wired connection between an exterior power supply and actuator processing circuit 607. Actuator power supply circuit 614 may be coupled to actuator processing circuit through a wired connection. Through the couple, actuator power supply circuit 614 may provide power to actuator processing circuit 607. Actuator power supply circuit 614 circuit may provide either AC voltage or DC voltage power to actuator processing circuit 607. In some embodiments, actuator power supply circuit 614 may be a battery that is coupled to the actuator processing circuit 607. In short, actuator power supply circuit 614 may provide power through a chemical reaction that creates a voltage potential.

Still referring to FIG. 6A, actuator processing circuit 607 may be configured to output a pulse width modulated (PWM) DC motor command 632 to control the speed of the motor. Motor 626 may be configured to receive a three-phase PWM voltage output (e.g., phase A, phase B, phase C) from motor drive inverter 624. The duty cycle of the PWM voltage output may define the rotational speed of motor 626 and may be determined by actuator processing circuit 607. Actuator processing circuit 607 may increase the duty cycle of the PWM voltage output to increase the speed of motor 626 and may decrease the duty cycle of the PWM voltage output to decrease the speed of motor 626.

Motor 626 may be coupled to drive device 628. Drive device 628 may be a drive mechanism, a hub, or other device configured to drive or effectuate movement of a HVAC system component (e.g., equipment 604). For example, drive device 628 may be configured to receive a shaft of a damper, a valve, or any other movable HVAC system component in order to drive (e.g., rotate) the shaft. In some embodiments, actuator 602 includes a coupling device configured to aid in coupling drive device 628 to the movable HVAC system component. For example, the coupling device may facilitate attaching drive device 628 to a valve or damper shaft.

Main actuator controller 612 may be configured to receive external data 618 (e.g., flow rate setpoints, position setpoints, speed setpoints, etc.) from communications circuit 620 and flow signals 646 from a flow sensor processing circuit 638. In some embodiments, main actuator controller 612 receives data from additional sources. For example, motor current sensor 622 may be configured to measure the electric current provided to motor 626. Motor current sensor 622 may generate a feedback signal indicating the motor current 630 and may provide this signal to main actuator controller 612 within actuator processing circuit 607. Based on the feedback signal, main actuator controller 612 can determine if motor commands 632 is resulting in expected operation of motor 626. In other words, main actuator controller 612 can determine if an operating status of motor 626 is reflective of expected values. The expected values can be include any value or values that are acceptable values of the feedback signal. In some embodiments, the expected values are a range of values that are appropriate for the feedback signal. If the current indicated by the feedback signal is representative of expected values, main actuator controller 612 may continue standard operations. However, if the current indicated by the feedback signal is not representative of expected values, main actuator controller 612 may initiate a corrective action. In some embodiments, the feedback signal indicates other measurements associated with motor 626 and/or motor drive inverter 624. For example, the feedback signal may indicate a voltage, a resistance, a power consumption value, etc.

Corrective actions may include any actions that address unexpected values of the feedback signal (i.e., motor current 630). For example, main actuator controller 612 may modify motor commands 632 to adjust operation of motor drive inverter 624. In effect, main actuator controller 612 may be recalibrated to account for changes in how motor 626 and/or motor drive inverter 624 operate based on the feedback signal. If motor current 630 is lower than expected, main actuator controller 612 may increase the duty cycle associated with motor commands 632 to increase rotational speed of motor 626. As another example of a corrective action, main actuator controller 612 may schedule motor 626 for repair. Inaccurate values of the feedback signal (i.e., inaccurate values of motor current 630) may indicate some degradation of motor 626 has occurred. As such, main actuator controller 612 can initiate a corrective action to reduce effects of the degradation. In general, main actuator controller 612 can initiate any corrective action to address determinations of inaccuracies in feedback signals. Advantageously, by allowing main actuator controller 612 to initiate corrective actions, further functionality is included in actuator 602, thereby reducing/eliminating additional components needed in valve assembly 600.

Actuator 602 is further shown to include a communications circuit 620. Communications circuit 620 may be a wired or wireless communications link and may use any of a variety of disparate communications protocols (e.g., BACnet, LON, WiFi, Bluetooth, NFC, TCP/IP, etc.). In some embodiments, communications circuit 620 is an integrated circuit, chip, or microcontroller unit (MCU) configured to bridge communications actuator 602 and external systems or devices. In some embodiments, communications circuit 620 is the Johnson Controls BACnet on a Chip (JBOC) product. For example, communications circuit 620 can be a pre-certified BACnet communication module capable of communicating on a building automation and controls network (BACnet) using a master/slave token passing (MSTP) protocol. Communications circuit 620 can be added to any existing product to enable BACnet communication with minimal software and hardware design effort. In other words, communications circuit 620 provides a BACnet interface for the pressure disturbance rejection valve assembly 600. Furthermore, details regarding the JBOC product are disclosed in U.S. patent application Ser. No. 15/207,431 filed Jul. 11, 2016, the entire disclosure of which is incorporated by reference herein.

Communications circuit 620 may also be configured to support data communications within actuator 602. In some embodiments, communications circuit 620 may receive internal actuator data 616 from main actuator controller 612. For example, internal actuator data 616 may include the sensed motor current 630, a measured or calculated motor torque, the actuator position or speed, configuration parameters, end stop locations, stroke length parameters, commissioning data, equipment model data, firmware versions, software versions, time series data, a cumulative number of stop/start commands, a total distance traveled, an amount of time required to open/close equipment 604 (e.g., a valve), or any other type of data used or stored internally within actuator 602. In some embodiments, communications circuit 620 may transmit external data 618 to main actuator controller 612. External data 618 may include, for example, flow rate setpoints, position setpoints, speed setpoints, control signals, configuration parameters, end stop locations, stroke length parameters, commissioning data, equipment model data, actuator firmware, actuator software, or any other type of data which can be used by actuator 602 to operate the motor 626 and/or drive device 628. For example, external data 618 may include a flow rate setpoint indicating a desired flow rate through a conduit in order to affect a desired environmental condition.

In some embodiments, external data 618 is a DC voltage control signal. Actuator 602 can be a linear proportional actuator configured to control the position of drive device 628 according to the value of the DC voltage received. For example, a minimum input voltage (e.g., 0.0 VDC) may correspond to a minimum rotational position of drive device 628 (e.g., 0 degrees, −5 degrees, etc.), whereas a maximum input voltage (e.g., 10.0 VDC) may correspond to a maximum rotational position of drive device 628 (e.g., 90 degrees, 95 degrees, etc.). Input voltages between the minimum and maximum input voltages may cause actuator 602 to move drive device 628 into an intermediate position between the minimum rotational position and the maximum rotational position. In other embodiments, actuator 602 can be a non-linear actuator or may use different input voltage ranges or a different type of input control signal (e.g., AC voltage or current) to control the position and/or rotational speed of drive device 628.

In some embodiments, external data 618 is an AC voltage control signal. Communications circuit 620 may be configured to transmit an AC voltage signal having a standard power line voltage (e.g., 120 VAC or 230 VAC at 50/60 Hz). The frequency of the voltage signal can be modulated (e.g., by main actuator controller 612) to adjust the rotational position and/or speed of drive device 628. In some embodiments, actuator 602 uses the voltage signal to power various components of actuator 602. Actuator 602 may use the AC voltage signal received via communications circuit 620 as a control signal, a source of electric power, or both. In some embodiments, the voltage signal is received from a power supply line that provides actuator 602 with an AC voltage having a constant or substantially constant frequency (e.g., 120 VAC or 230 VAC at 50 Hz or 60 Hz). Communications circuit 620 may include one or more data connections (separate from the power supply line) through which actuator 602 receives control signals from a controller or another actuator (e.g., 0-10 VDC control signals).

Still referring to FIG. 6A, actuator 602 is shown to include a flow sensor printed circuit board 636. Flow sensor printed circuit board 636 may be any sort of printed circuit board (PCB) such as a single sided PCB, a double sided PCB, a multilayer PCB, a rigid PCB, a flex PCB, a rigid-flex PCB, or two or more combinations. Flow sensor printed circuit board 636 is further shown to include a flow sensor processing circuit 638 communicably coupled to main actuator controller 612 and a plurality of transducers 634. Flow sensor processing circuit 638 may be any type of circuit such as an integrated circuit, a chip, or a microcontroller unit (MCU). Flow sensor processing circuit 638 is shown to include a flow sensor processor 640 and a flow sensor memory 642. Flow sensor processor 640 can be a general purpose or specific purpose processor, an application specific integrated circuit (ASIC), one or more field programmable gate arrays (FPGAs), a group of processing components, or other suitable processing components. Flow sensor processor 640 can be configured to execute computer code or instructions stored in flow sensor memory 642 or received from other computer readable media (e.g., CDROM, network storage, a remote server, etc.)

Flow sensor memory 642 may include one or more devices (e.g., memory units, memory devices, storage devices, etc.) for storing data and/or computer code for completing and/or facilitating the various processes described in the present disclosure. Flow sensor memory 642 may include random access memory (RAM), read-only memory (ROM), hard drive storage, temporary storage, non-volatile memory, flash memory, optical memory, or any other suitable memory for storing software objects and/or computer instructions. Flow sensor memory 642 may include database components, object code components, script components, or any other type of information structure for supporting the various activities and information structures described in the present disclosure. Flow sensor memory 642 may be communicably connected to flow sensor processor 640 via flow sensor processing circuit 638 and may include computer code for executing (e.g., by flow sensor processor 640) one or more processes described herein. When flow sensor processor 640 executes instructions stored in flow sensor memory 642, flow sensor processor 640 generally configures flow sensor processing circuit 638 to complete such activities.

Flow sensor processing circuit 638 may be further configured to receive raw measurement data set 648 from transducers 634. It should be appreciated that raw measurement data set 648 may not include any actual flow rates. Rather, raw measurement data set 648 can include raw measurements from transducers 634 that can be used to calculate flow proportionate values and thereby flow rates and/or may calculate the flow rates directly based on the raw measurements. As described in greater detail below, flow sensor processing circuit 638 can be configured to calculate the flow rates based on raw measurement data set 648. Advantageously, calculating flow rates by flow sensor processing circuit 638 reduces complexity of transducers 634 and/or of other sensors in valve assembly 600. In particular, transducers 634 may not be required to include processing circuits for parsing through raw measurements. Further, additional sensors may not be required in valve assembly 600 to process measurements taken by transducers 634. Instead, flow sensor processing circuit 638 (and therefore actuator 602) can handle processing of the raw measurements, thereby reducing costs, a number of components, and overall complexity of valve assembly 600.

Flow sensor memory 642 is shown to include a flow signal generator 650. Flow signal generator 650 can be configured to process raw measurement data set 648 to determine a flow signal 646. Based on raw measurements (e.g., voltage, current, etc.) included in raw measurement data set 648, flow signal generator 650 can calculate a flow rate of a fluid (e.g., of water, of air, etc.) through a conduit of valve assembly 600. Specifically, flow signal generator 650 may calculate a flow proportionate value based on the raw measurements and determine the flow signal based on the flow proportionate value. For example, if the raw measurements include voltages indicative of a pressure exerted on transducers 634, flow signal generator 650 can determine a value proportional to a flow rate based on the raw measurements, a density of the fluid, some equation that accounts for calibration of transducers 634, internal resistances of wires providing the voltages, etc. As the raw measurements provided by transducers 634 may not be directly proportional to the flow rate, flow signal generator 650 should perform said processing to calculate a flow proportionate value to determine the flow signal.

In some embodiments, flow signal generator 650 requires additional information beyond the raw measurements of raw measurement data set 648 to calculate the flow rate. For example, to calculate the flow rate indicated by flow signal 646, flow signal generator 650 can utilize information regarding transducers 634 such as a brand of transducers 634, calibration settings of transducers 634, spacing of transducers 634, etc. Based on information regarding transducers 634, flow signal generator 650 can utilize equations and/or other relationships to calculate a flow proportionate value and thereby the flow rate. In this way, flow signal generator 650 can allow actuator 602 to calculate flow rates as compared to requiring complex sensors that include transducers 634 and processing components and/or requiring incorporation of additional components to valve assembly 600. Flow signal generator 650 is described in greater detail below with reference to FIG. 6B. It should be appreciated that flow signal generator 650 is shown as an example of a component that flow sensor memory 642 may include. Flow sensor memory 642 may include additional components and/or other components rather than flow signal generator 650. In general, flow sensor memory 642 can include any components necessary for generating flow signal 646.

Flow sensor printed circuit board 636 is also shown to include a flow sensor power supply circuit 644. Flow sensor power supply circuit 644 may be an unregulated power supply, a linear regulated power supply, a switching power supply, or a ripple regulated power supply. In some embodiments, flow sensor power supply circuit 644 is a wired connection between an exterior power supply and flow sensor processing circuit 638. Flow sensor power supply circuit 644 may be coupled to flow sensor processing circuit 638 through a wired connection. Flow sensor power supply circuit 644 may be configured to provide power to flow sensor processing circuit 638. Flow sensor power supply circuit 644 may provide either AC voltage or DC voltage power to flow sensor processing circuit 638. In some embodiments, flow sensor power supply circuit 644 may be a battery that is coupled to the flow sensor processing circuit 638. In short, flow sensor power supply circuit 644 may provide power through a chemical reaction that creates a voltage potential.

Valve assembly 600 may include the transducers 634. Transducers 634 may be identical or substantially similar to transducers 510 in valve assembly 500. Transducers 634 may be communicably coupled to flow sensor processing circuit 638. Transducer 634 may be configured to take a measurement of a physical property of the fluid flowing through equipment 604 and provide raw measurement data set 648 to flow sensor processing circuit 638. In some embodiments, raw measurement data set 648 may be output as an analog output signal. For example, the analog output signal can be represented by a voltage, current, or resistance. In general, transducers 634 can provide raw measurement data set 648 including raw measurements to actuator 602 for processing.

In some embodiments, actuator 602, flow sensor processing circuit 638 and actuator processing circuit 607 are located within a common device chassis or housing. In short, actuator 602, flow sensor processing circuit 638, and actuator processing circuit 607 may not be packaged as separate devices, but as a single device. In some embodiments, additional components (e.g., equipment 604, transducers 634, etc.) are packaged in the single device. Reducing the number of devices in an HVAC system may provide numerous advantages, most notably in time and cost savings during the installation process. Because it is not necessary to install actuator 602, flow sensor processing circuit 638, and actuator processing circuit 607 as separate devices, technicians performing the installation may require less specialized training and fewer tools. Other advantages include integrated calibration. Because actuator processing circuit 607 is communicably coupled to flow sensor processing circuit 638 and actuator 602, actuator processing circuit 607 may include a set of instructions to automatically calibrate the device through various setpoints of actuator 602 and flow signal 646. By having an all-in one device that can calibrate itself, an annual calibration is not required. This saves time and cost. However, in some embodiments, actuator 602, flow sensor processing circuit 638, and actuator processing circuit 607 are packaged as separate devices that may be communicably coupled via a wired or a wireless connection. In some embodiments, flow sensor printed circuit board 636 and actuator printed circuit board 606 are within separate enclosures.

Figure 6B:
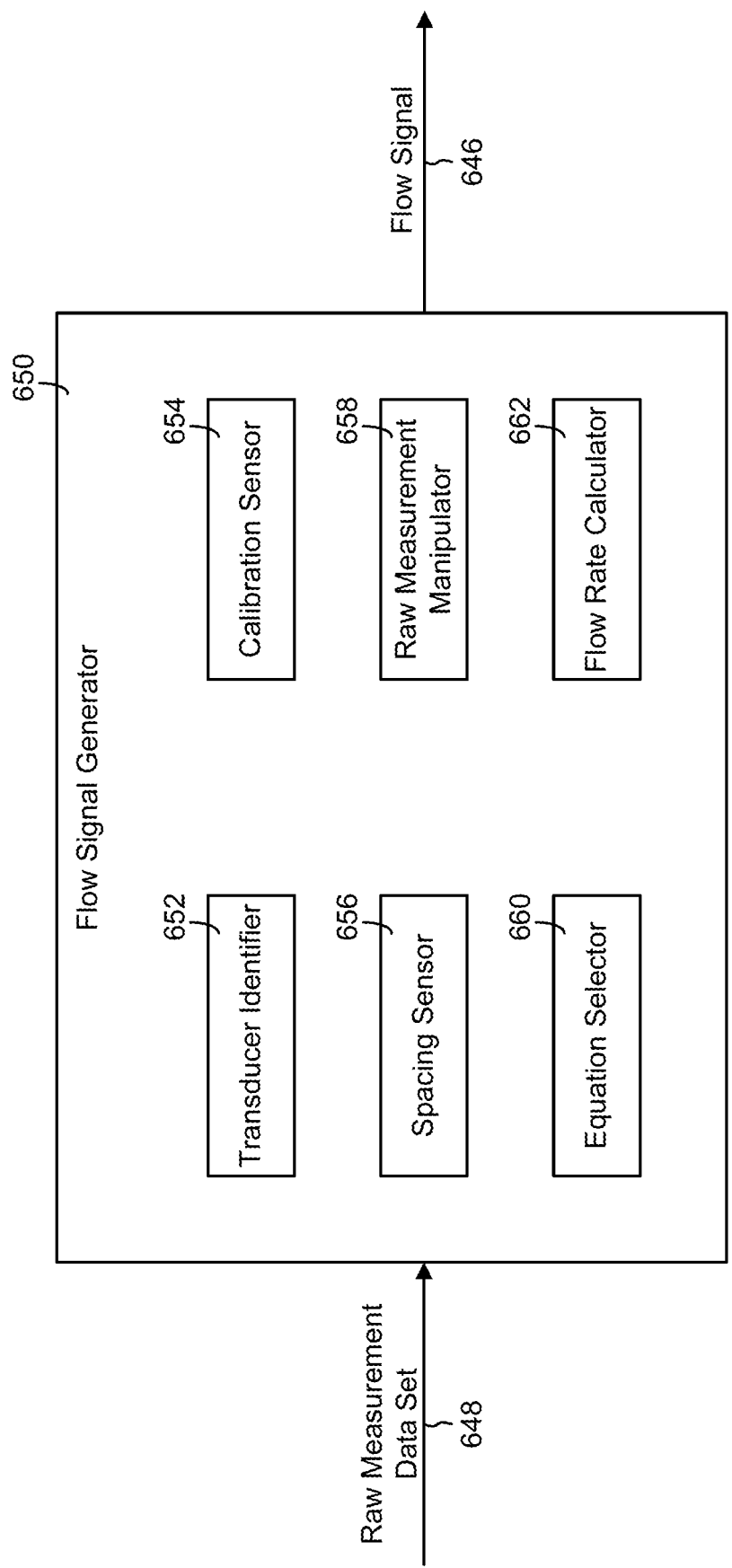
FIG. 6B is a block diagram of a flow signal generator in the pressure disturbance rejection valve assembly of FIG. 6A, according to some embodiments.

Referring now to FIG. 6B, flow signal generator 650 of FIG. 6A is shown in greater detail, according to some embodiments. As described above with reference to FIG. 6A, flow signal generator 650 can be configured to generate flow signal 646 based on raw measurement data set 648. Flow signal generator 650 is shown to include various components which are described in detail below. Each component of flow signal generator 650 is shown purely for sake of example. Flow signal generator 650 may include less, more, and/or different components than as shown in FIG. 6B. In some embodiments, components of flow signal generator 650 are implemented as different components of flow sensor memory 642. In general, flow signal generator 650 and/or flow sensor memory 642 can include any components necessary for generating flow signal 646 based on raw measurement data set 648.

Flow signal generator 650 is shown to include a transducer identifier 652. Transducer identifier 652 can be configured to identify what types of transducers are included in transducers 634 and/or other information regarding transducers 634. For example, transducer identifier 652 may identify brands of transducers 634, specific models (e.g., as given by model numbers) of transducers 634, specific components of transducers 634 (e.g., components used to sense pressure and/or other measurements describing flow), etc. The information identified by transducer identifier 652 can be utilized to determine various information regarding raw measurement data set 648. For example, raw measurement manipulator 658 may utilize the information identified by transducer identifier 652 to determine an expected format (e.g., voltage, current, resistance, etc.) that the raw measurements of raw measurement data set 648 may be provided in based on a model of transducers 634. In this way, transducer identifier 652 can reduce/eliminate a need for flow signal generator 650 to process the raw measurements to determine the format. The identified information regarding transducers 634 can be useful for other purposes such as determining initial calibration settings of transducers 634, how transducers 634 may be installed in a conduit, etc.

Flow signal generator 650 is also shown to include a calibration sensor 654. Calibration sensor 654 can be configured to determine calibration settings of transducers 634. Calibration settings can indicate relationships between transducers 634 and the raw measurements included in raw measurement data set 648. Different transducers of transducers 634 may have different calibration settings (e.g., different relationships between sensed voltage and flow) that need to be known in order to accurately convert the raw measurements into a flow rate. Without knowledge of the calibration settings, flow signal generator 650 may otherwise calculate an inaccurate flow rate as a result of incorrect assumptions regarding how transducers 634 are calibrated. To mitigate said effects, calibration sensor 654 can determine calibration settings of transducers 634 that can be utilized to accurately calculate the flow rate respective of how transducers 634 are calibrated.

To determine the calibration settings, calibration sensor 654 can utilize various approaches. In some embodiments, calibration sensor 654 collects raw measurements provided by transducers 634 (e.g., as provided in raw measurement data set 648) and estimates calibration settings based on the raw measurements. In some embodiments, calibration sensor 654 utilizes other information to determine the calibration settings. For example, calibration sensor 654 can utilize model numbers of transducers 634 identified by transducer identifier 652 to determine initial calibration settings indicated by a manufacturer(s). In some embodiments, calibration sensor 654 determines the calibration settings via a different approach.

Still referring to FIG. 6B, flow signal generator 650 is shown to include a spacing sensor 656. Spacing sensor 656 can be configured to determine a distance between individual transducers of transducers 634. For example, if transducers 634 includes two transducers, spacing sensor 656 can determine a distance between the two transducers (e.g., as measured in inches, centimeters, meters, etc.). Distances between transducers 634 can be particularly useful in calculating the flow rate. For example, the distances between transducers 634 can be utilized in calculating a time of flight of ultrasonic waves through a fluid. The distances can be used to determine the flow rate based on the distance and a time between when an ultrasonic wave is emitted and received by different transducers.

Flow signal generator 650 is also shown to include a raw measurement manipulator 658. Raw measurement manipulator 658 can be configured to generate processed data based on raw measurement data set 648. Raw measurement manipulator 658 can aggregate raw measurements, determine formats of the raw measurements, combine raw measurements, and/or can perform any other appropriate manipulations of the raw measurements included in raw measurement data set 648. For example, raw measurement manipulator 658 can identify a format of the raw measurements indicated by raw measurement data set 648 and group the raw measurements based on the formats. The formats can include any various format which transducers 634 can provide raw measurements of flow rates. For example, the raw measurements may be formatted as voltages or currents. Identification of the formats of the raw measurements can be critical in ensuring correct equations are utilized to determine the flow rate indicated by flow signal 646. In some embodiments, raw measurement manipulator 658 extracts the formats directly from raw measurement data set 648. In some embodiments, raw measurement manipulator 658 utilizes information determined by other components of flow signal generator 650 to determine the formats. For example, raw measurement manipulator 658 can determine expected data formats based on models of transducers 634 identified by transducer identifier 652. Based on the formats, raw measurement manipulator 658 can group the raw measurements such that it is easier for other components of flow signal generator 650 to calculate flow proportionate values and/or flow rates.

In some embodiments, raw measurement manipulator 658 organizes the raw measurements chronologically. As raw measurements are received from transducers 634, they can be sorted by raw measurement manipulator 658 such that the measurements are stored in chronological order, associated with a timestamp indicating a time when the measurements were gathered and/or received, and/or organized in some other fashion. Chronological sorting of the raw measurements can be useful in various applications such as tracking the flow rates over time, calculating the flow rate based on a distance between transducers 634 and the amount of time between measurements, etc.

In some embodiments, raw measurement manipulator 658 performs other manipulations on the raw measurements of raw measurement data set 648 to generate processed data (e.g., flow proportionate values) that can be utilized to calculate the flow rate. For example, raw measurement manipulator 658 can identify measurements that may be inaccurate (e.g., a raw voltage measurement twice as large as any other measurements) and purge said data from a data set used to calculate the flow rate. Inaccurate measurements may result from faulty transducers, data corruption in transit between transducers 634 and actuator 602, and/or other various sources. It should be appreciated that raw measurement manipulator 658 can perform any manipulations on the raw measurements that may be helpful in calculating the flow rate. In a sense, the manipulations performed by raw measurement manipulator 658 can be considered as processing of raw measurement data set 648. As received, raw measurement data set 648 may include measurements that are not directly usable to calculate the flow rate. As such, raw measurement manipulator 658 can be configured to perform processing operations (i.e., manipulations) on raw measurement data set 648 to generate processed data that is usable to calculate the flow rate. In some embodiments, the processed data is generated in a machine-readable format (e.g., binary representation that can be interpreted by computers) for further calculations.

Flow signal generator 650 is shown to include an equation selector 660. Equation selector 660 can select one or more equations to utilize in calculating the flow rate based on information determined by other components of flow signal generator 650. In some embodiments, equation selector 660 and/or a different component of flow sensor memory 642 (e.g., a database component) may store equations that can be used to calculate the flow rate. Said equations can utilize various measurements gathered by transducers 634 to calculate the flow rate. As some examples, a first equation may relate measurements of current over time to the flow rate, a second equation may relate voltage and resistance measurements to the flow rate, a third equation may relate a time of flight of an ultrasonic signal through a substance to the flow rate, etc. In the case of the third equation, the time of flight may be determined based on, for example, spikes in the voltage/current provided by transducers 634 that indicate when an ultrasonic signal is transmitted by one transducer 634 and received by another transducer 634. In some embodiments, an equation selected by equation selector 660 is augmented to account for characteristics of a fluid measured by transducers 634. For example, if transducers 634 are pressure transducers that output a voltage/current respective of a pressure exerted on transducers 634, the equation may be augmented based on a density of the fluid to ensure an accurate flow proportionate value and/or accurate flow signal is calculated. Specifically, in the example, small increases in flow for a more dense fluid may result in larger pressure changes as compared to small increases in flow for a less dense fluid. Accordingly, the equation can be manipulated to account for characteristics of a fluid to ensure that an accurate flow proportionate value is calculated.

The equations selected by equation selector 660 can be received/generated from a variety of sources. The equations may be inputted by a user, generated based on measurements over time, received from a manufacturer of transducers 634, etc. It should be appreciated that the equations can include mathematical equations, mappings, models (e.g., mathematical models, artificial intelligence models, etc.), and/or any other relationship that can be used to calculate flow rates based on measurements. In some embodiments, the equations are stored by an external entity. For example, the equations may be stored by a cloud database. In this case, equation selector 660 can request and receive the equation from the external entity (e.g., via communications circuit 620).

Equation selector 660 can select an appropriate equation(s) based on information determined by other components of flow signal generator 650. For example, equation selector 660 may utilize model numbers of transducers 634 identified by transducer identifier 652 to select an equation provided by a manufacturer. As another example, equation selector 660 can select an equation based on data formats identified by raw measurement manipulator 658. In some embodiments, equation selector 660 may select a generalized equation and augment the equation based on information determined by components of flow signal generator 650. For example, equation selector 660 may select a general equation relating voltage to flow rates and augment the equation (e.g., by changing constants and scaling factors of the equation) based on calibration settings identified by calibration sensor 654, characteristics of a measured fluid, etc. In this way, generalized equations can be augmented to be reflective of current calibration settings of transducers 634. In some embodiments, equation selector 660 can select any of a multitude of different equations based on an identity of transducers 634 that are feeding data to actuator 602. In some embodiments, equation selector 660 provides the selected/augmented equation to a flow rate calculator 662.

Flow signal generator 650 is shown to include flow rate calculator 662. Flow rate calculator 662 can be configured to calculate a flow rate of a substance (e.g., a liquid, air, etc.) through a conduit. In some embodiments, flow rate calculator 662 calculates a flow proportionate value used to calculate the flow rate. Based on the equation selected by equation selector 660, flow rate calculator 662 can provide the raw measurements of raw measurement data set 648 as input to calculate the flow rate of the substance. For example, if the raw measurements are known to indicate a time of flight of an ultrasonic signal through the substance, flow rate calculator 662 may utilize an equation to calculate the difference between an upstream and a downstream signal and determine the flow rate based on the difference. In some embodiments, flow rate calculator 662 utilizes multiple equations to determine the flow rate. Based on an output of the equation(s), flow rate calculator 662 can generate flow signal 646.

As an example of how flow rate calculator 662 can calculate the flow rate, consider a situation where raw measurement data set 648 includes raw measurements taken by an upstream ultrasonic flow transducer and a downstream ultrasonic flow transducer. In this situation, the flow rate can be calculated based on a time of flight indicated by a time difference between upstream and downstream signal times. Said time difference may be determined based on when voltage and/or current signals greater than a predefined threshold are received by flow signal generator 650. The upstream signal time $T_{up}$ and the downstream signal time $T_{down}$ can be included in/indicated by raw measurement data set 648. $T_{up}$ and $T_{down}$ can be represented by flow rate calculator 662 via the following equations:

$$T_{up} = \frac{L}{c+v}$$
$$T_{down} = \frac{L}{c-v}$$

where L is a distance between receiving and transmitting transducers, c is a speed of sound, and v is the flow rate. Based on the above equations, flow rate calculator 662 can represent the time of flight ΔT as:

$$\Delta T = T_{down} - T_{up} = \frac{2Lv}{c^2 - v^2}$$

The above equation can be augmented by flow rate calculator 662 to solve for the flow rate as:

$$v = \frac{L}{2} \times \left(\frac{1}{T_{up}} - \frac{1}{T_{down}}\right) = \frac{L}{2} \times \left(\frac{T_{down} - T_{up}}{T_{down}T_{up}}\right) = \frac{L}{2} \times \left(\frac{\Delta T}{T_{down}T_{up}}\right)$$

which assumes an inclination angle between the transducers is perpendicular. In some embodiments, the above equations are selected by equation selector 660 and provided to flow rate calculator 662. In this way, flow rate calculator 662 can calculate the flow rate based on raw measurement data set 648.

Flow signal 646 can include the flow rate calculated by flow rate calculator 662. In some embodiments, flow signal 646 is an analog output signal represented by voltage current, or resistance and indicative of the flow rate of the substance traveling through equipment 604. In other embodiments, flow signal 646 is a digital signal indicative of the flow rate of the fluid traveling through equipment 604. In further embodiments, the flow signal 646 is output using a digital communications protocol (e.g. I²C, UART, RS-232, RS-485, Universal Serial Bus, CAN, SPI, etc.).

Figure 7A:
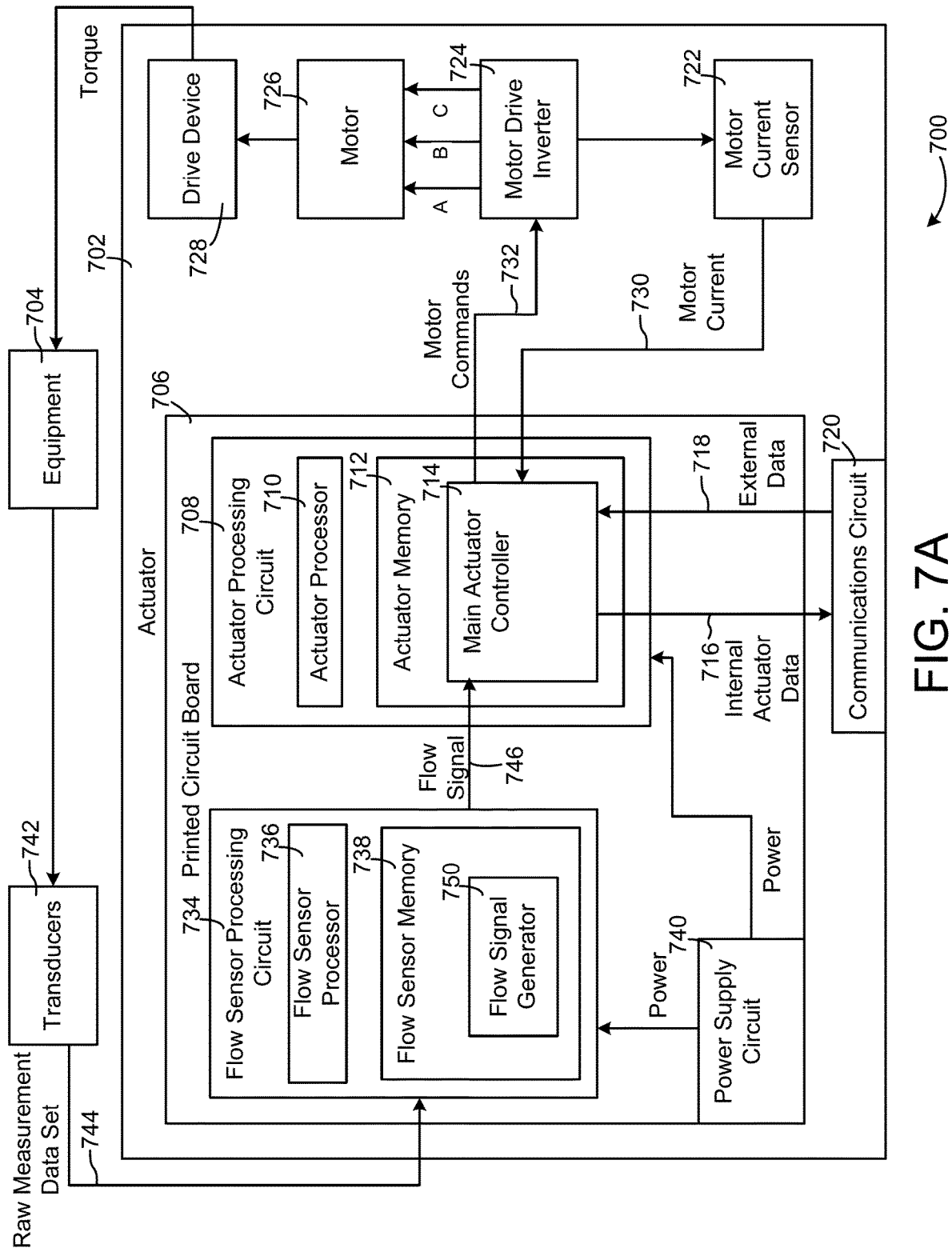
FIG. 7A is a block diagram of another pressure disturbance rejection valve assembly that can be implemented in the HVAC system of FIG. 1 using a single printed circuit board within one common device chassis, according to some embodiments.

Turning now to FIG. 7A, a block diagram of another pressure disturbance rejection valve assembly 700 is shown using a single printed circuit board within one common device chassis, according to some embodiments. Valve assembly 700 may be used in HVAC system 100, waterside system 200, airside system 300, or BMS 400, as described with reference to FIGS. 1-4. Valve assembly 700 may be identical or substantially similar to valve assembly 600 as described with reference to FIG. 6A, with the exception that flow sensor processing circuit 734 (which may be identical or substantially similar to flow sensor processing circuit 638) and actuator processing circuit 708 (which may be identical or substantially similar to actuator processing circuit 607) are disposed within printed circuit board 706. In some embodiments, printed circuit board 706 includes communications circuit 720. In some embodiments, functionality of flow sensor processing circuit 734 and actuator processing circuit 708 are included in a single processing circuit.

Printed circuit board 706 is further shown to include a power supply circuit 740. Power supply circuit 740 may be an unregulated power supply, a linear regulated power supply, a switching power supply, or a ripple regulated power supply. In some embodiments, power supply circuit 740 is a wired connection between an exterior power supply and both actuator processing circuit 708 and flow sensor processing circuit 734. Power supply circuit 740 may be coupled to both actuator processing circuit 708 and flow sensor processing circuit 734 through a wired connection. Power supply circuit 740 may be configured to provide power to a plurality of circuits such as actuator processing circuit 708 and flow sensor processing circuit 734. Power supply circuit 740 may provide either AC voltage or DC voltage power to both actuator processing circuit 708 and flow sensor processing circuit 734. In some embodiments, power supply circuit 740 may be a battery that is coupled to both actuator processing circuit 708 and flow sensor processing circuit 734. In short, power supply circuit 740 may provide power through a chemical reaction that creates a voltage potential.

Figure 7B:
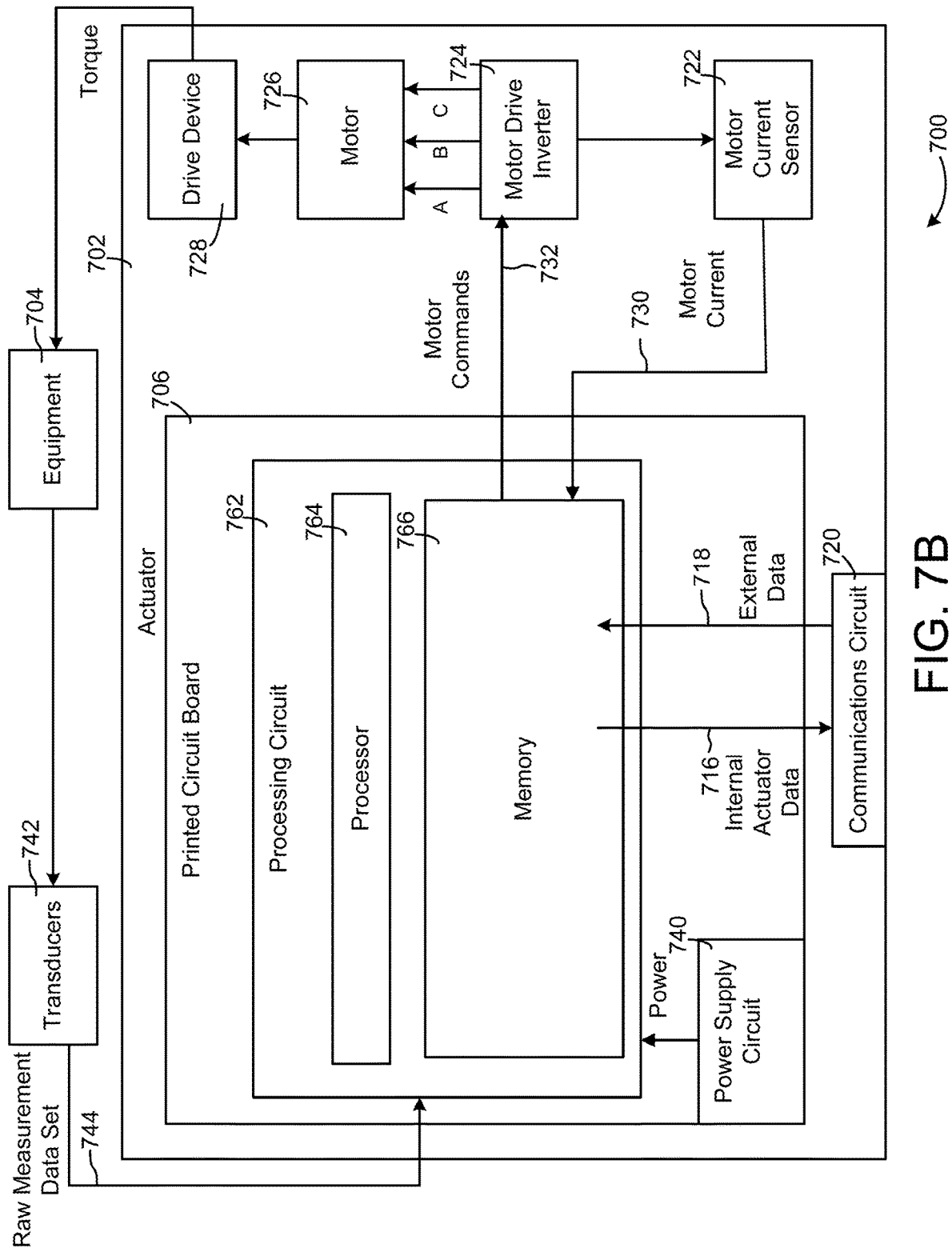
FIG. 7B is a block diagram of the pressure disturbance rejection valve assembly of FIG. 7A with a single processing circuit within the single printed circuit board, according to some embodiments.

Referring now to FIG. 7B, an alternative configuration of pressure disturbance rejection valve assembly 700 of FIG. 7A with a single processing circuit 762 within printed circuit board 706 is shown, according to some embodiments. As compared to FIG. 7A, FIG. 7B can illustrate how printed circuit board 706 may include a single processing circuit (i.e., processing circuit 762) as opposed to multiple processing circuits, thereby simplifying actuator 702. In some embodiments, processing circuit 762 includes some and/or all of the functionality of flow sensor processing circuit 734 and actuator processing circuit 708 as described with reference to FIG. 7A. In some embodiments, printed circuit board 706 includes communications circuit 720.

In particular, a processor 764 of processing circuit 762 may be similar to and/or the same as both flow sensor processor 736 and actuator processor 710. Further, memory 766 may be similar to and/or the same as both flow sensor memory 738 and actuator memory 712. In this way, processing circuit 762 can be configured to generate/determine a flow signal (e.g., similar to and/or the same as flow signal 746), provide internal actuator data 716 to communications circuit 720, receive external data 718 from communications circuit 720, generate and provide motor commands 732 to motor driver inverter 724, receive motor current 730 from motor current sensor 722, and/or perform any/all other operations associated with flow sensor processing circuit 734 and/or actuator processing circuit 708. By including functionality of flow sensor processing circuit 734 and actuator processing circuit 708 into processing circuit 762, actuator 702 can constructed with fewer components. Simplification of actuator 702 can result in various benefits such as fewer components in pressure disturbance rejection valve assembly 700, streamlined upgrading of components in pressure disturbance rejection valve assembly 700, etc.

Figure 8:
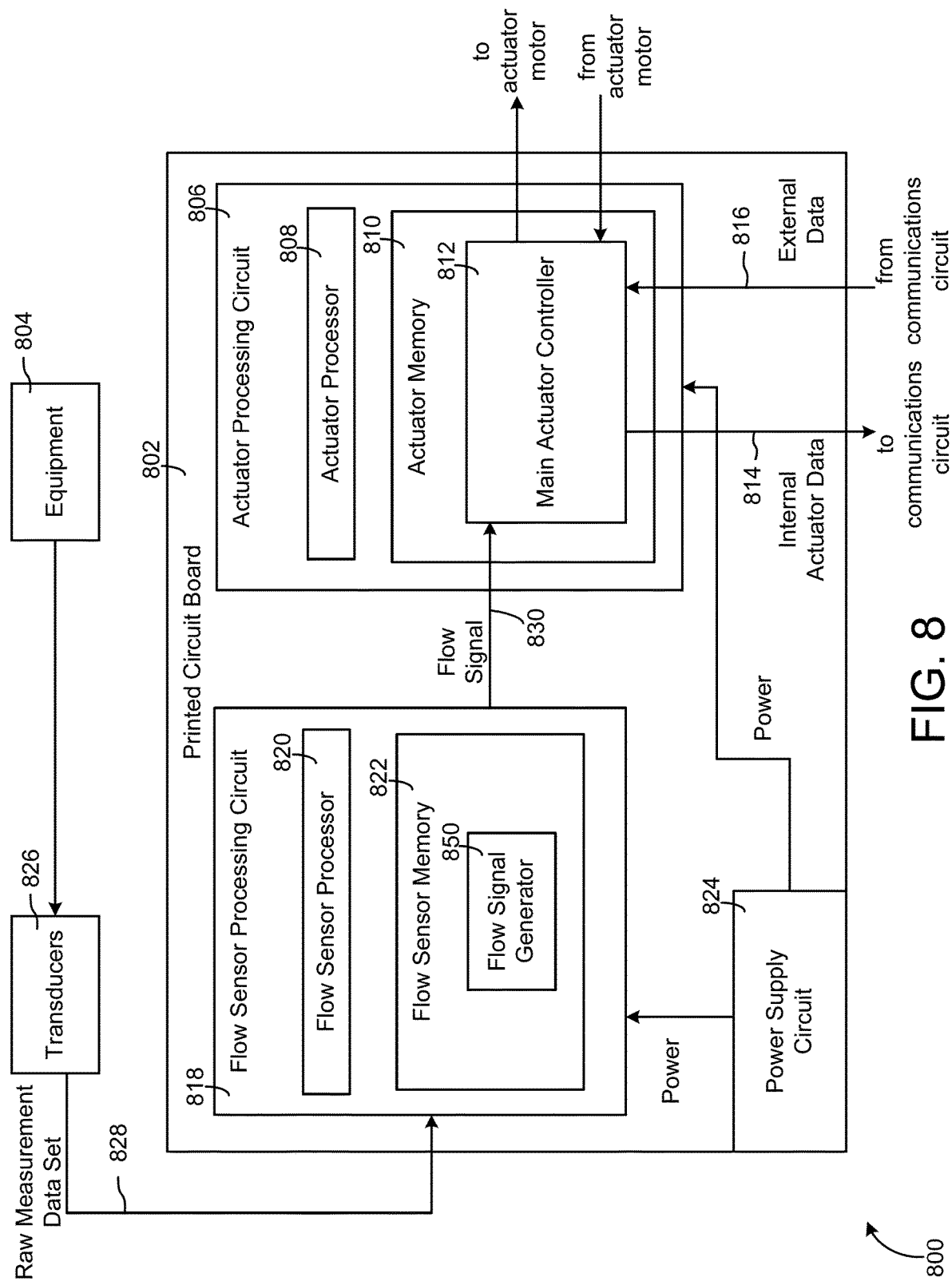
FIG. 8 is a block diagram of a pressure disturbance reaction system that can be implemented in the pressure disturbance rejection valve assembly of FIG. 7A, according to some embodiments.

Turning now to FIG. 8, a block diagram of a pressure disturbance reaction system 800 is shown, according to some embodiments. Pressure disturbance reaction system 800 may be used in pressure disturbance rejection valve assembly 700 with reference to FIG. 7A. For example, pressure disturbance reaction system 800 is shown to include printed circuit board 802, which may be identical or substantially similar to printed circuit board 706. However, printed circuit board 802 may be implemented separate from an actuator. For example, printed circuit board 802 can be implanted in an environmental controller that regulates environmental conditions in a building (e.g., building 10), in a computer of a building operator, in a smart device (e.g., a smart phone), in a cloud computation system, etc. In this way, printed circuit board 802 can handle control capabilities of an actuator within a single printed circuit board, but can be implemented in other systems that can provide control signals to an actuator.

Figure 9:
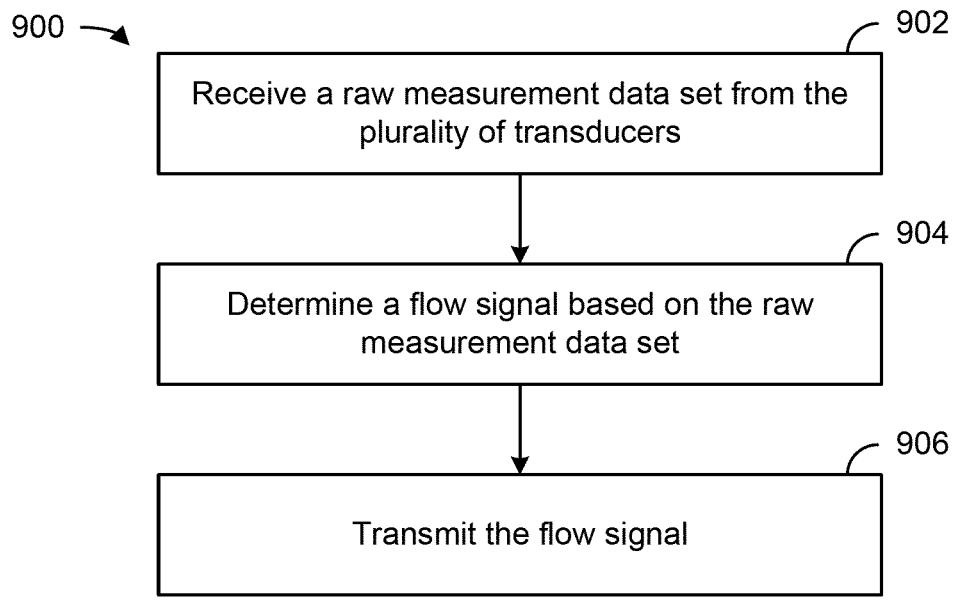
FIG. 9 is a flowchart of a process for determining and providing a flow signal, according to some embodiments.

Turning now to FIG. 9, a flow diagram of a process 900 for determining and providing a flow signal indicating a flow rate of fluid is shown, according to an exemplary embodiment. In some embodiments, process 900 may be performed by at least in part by the flow sensor processor 640 of the flow sensor processing circuit 638, described above with reference to FIG. 6A. It should be appreciated that process 900 is described below as performed by flow sensor processing circuit 638 and components therein for sake of example. In some embodiments, some and/or all steps of process 900 can be performed by components of flow sensor processing circuit 734 as described with reference to FIG. 7A, processing circuit 762 as described with reference to FIG. 7B, and/or flow sensor processing circuit 818 as described with reference to FIG. 8.

Process 900 is shown to commence with step 902, in which flow sensor processing circuit 638 receives raw measurement data set 648 from transducers 634. In some embodiments, raw measurement data set 648 is received as an analog input signal. Specifically, raw measurement data set 648 may be received as voltage and/or current signals outputted by transducers 634. In general, raw measurement data set 648 is indicative of measurements gathered by transducers 634. However, said measurements may not necessarily be proportionate to a flow rate. Accordingly, further processing of raw measurement data set 648 may be necessary respective of characteristics of a measured fluid, calibration settings of transducers 634, resistances of wires providing raw measurement data set 648, etc. In further embodiments, step 902 is performed by an input/output component of the flow sensor processing circuit 638 configured to receive the raw measurement data set 648 and provide it to the flow sensor processor 640. At step 904, raw measurement data set 648 is processed and a flow signal 646 is determined. In some embodiments, step 904 is performed by flow sensor processing circuit 638 through a set of instructions stored in flow sensor memory 642 and executed by flow sensor processor 640. The instructions may include calculations in regards to the time of flight of an ultrasonic through the fluid. This may include calculating the difference between an upstream and a downstream signal and generating a flow rate of the fluid based upon the difference. The flow sensor processor 640 may further provide the input/output component of the circuit with the flow signal 646.

In some embodiments, process 900 concludes with step 906, in which the input/output component of the flow sensor processing circuit 638 provides the flow signal 646. In some embodiments, flow signal 646 is provided as an analog output signal represented by voltage current, or resistance and indicative of the flow rate of the fluid traveling through equipment 604. In other embodiments, flow signal 646 is provided as a digital signal indicative of the flow rate of the fluid traveling through equipment 604. In further embodiments, the flow signal 646 is provided using a digital communications protocol (e.g. I²C, UART, RS-232, RS-485, Universal Serial Bus, CAN, SPI, etc.).

Figure 10:
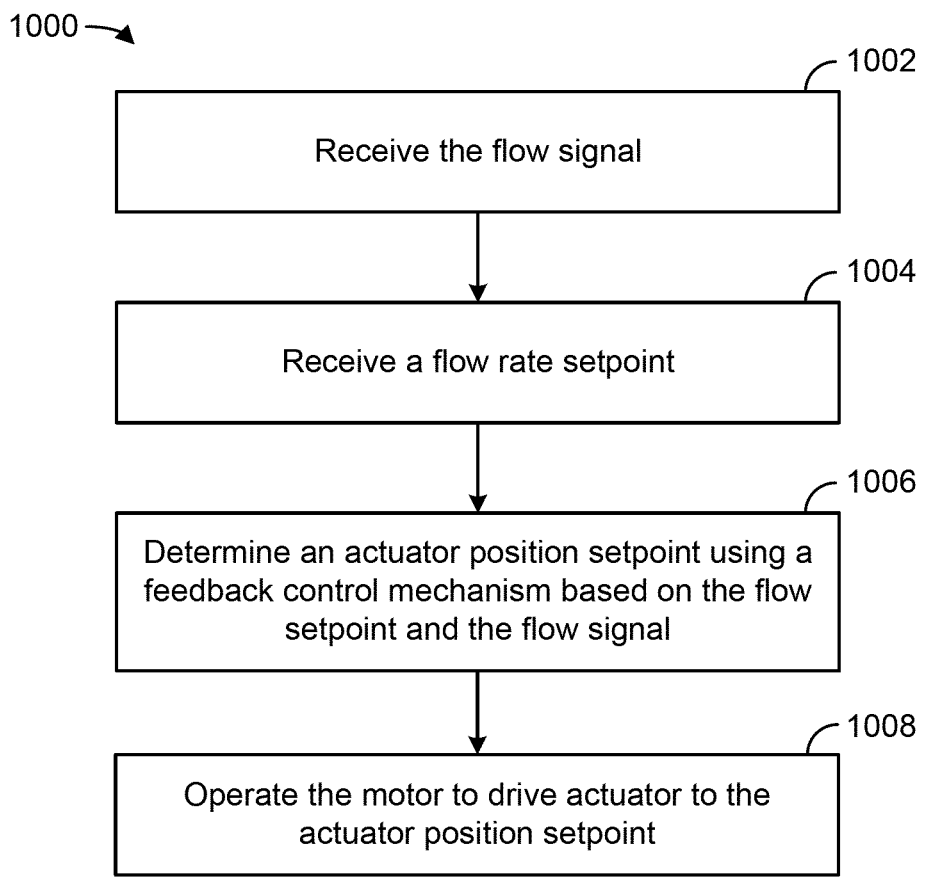
FIG. 10 is a flowchart of a process for operating a pressure disturbance rejection valve assembly, according to some embodiments.

Turning now to FIG. 10, a flow diagram of a process 1000 for operating a pressure disturbance rejection valve assembly, according to an exemplary embodiment. In some embodiments, process 1000 may be performed by at least in part by the actuator processor 608 of actuator processing circuit 607, described above with reference to FIG. 6A. It should be appreciated that process 1000 is described below as performed by actuator processing circuit 607 and components therein for sake of example. In some embodiments, some and/or all steps of process 900 can be performed by components of actuator processing circuit 708 as described with reference to FIG. 7A, processing circuit 762 as described with reference to FIG. 7B, and/or actuator processing circuit 806 as described with reference to FIG. 8.

Process 1000 is shown to commence with step 1002, in which actuator processing circuit 607 receives a flow signal 646 from flow sensor processing circuit 638. In some embodiments, the flow signal 646 is received as an analog input signal. In other embodiments, the flow signal 646 is received as a digital input signal indicative of the flow rate of the fluid traveling through equipment 604. In further embodiments, the flow signal 646 is received using a digital communications protocol (e.g. I²C, UART, RS-232, RS-485, Universal Serial Bus, CAN, SPI, etc.). Step 1002 may be performed by an input/output component of the actuator processing circuit 607 configured to receive the flow signal 646 and provide it to the main actuator controller 612.

At step 1004 main actuator controller 612 can receive a flow rate setpoint. In some embodiments, the flow rate setpoint is provided by an external device, external controller, etc. For example, BMS controller 366 may determine the flow rate setpoint and provide to the flow rate setpoint to main actuator controller 612. In some embodiments, main actuator controller 612 and/or a different component of actuator 602 determines the flow rate setpoint based on available data (e.g., the raw measurement data set). At step 1006, the main actuator controller 612 determines an actuator position setpoint. In some embodiments, determination of an actuator position setpoint is determined by a controller employing a PVDC scheme. The actuator position setpoint can be determined such that the flow rate setpoint is achieved. For example, if the flow rate setpoint is higher than a current flow rate, the actuator position setpoint can be determined such that a valve is opened further to increase the flow rate. Process 1000 concludes with step 1008 in which the actuator processing circuit 607 operates the motor 626 to drive the drive device 628 and the equipment 604 to the actuator position setpoint. In further embodiments, process 900 with reference to FIG. 9 and process 1000 can be performed on a single printed circuit board such as printed circuit board 706 with reference to FIG. 7A. By performing both processes on printed circuit board 706, there are multiple advantages including, for example, less material usage, faster communication, and shared resources such as power supply circuit 740.

Figure 11:
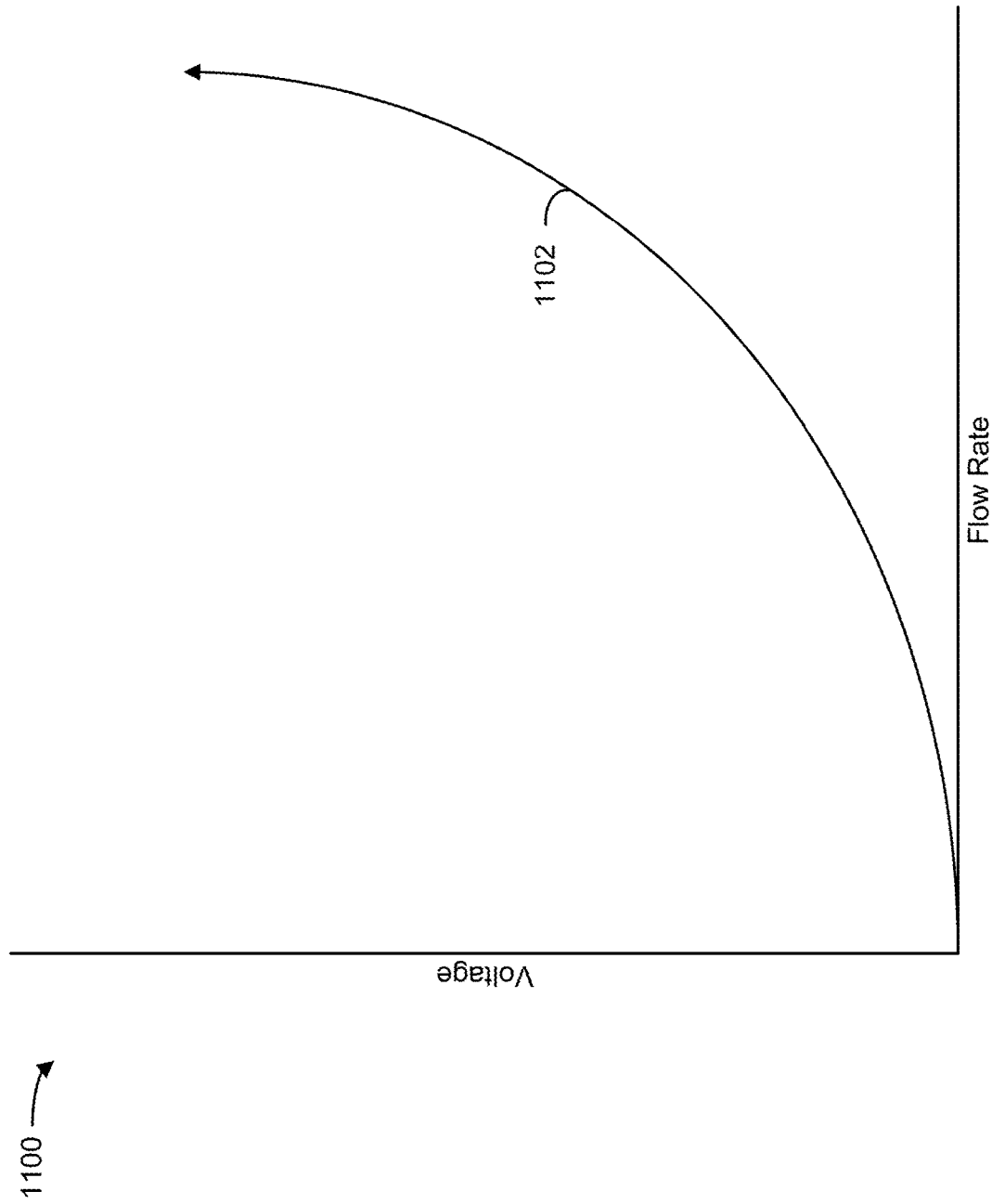
FIG. 11 is a graph illustrating an example relationship between a flow rate and a voltage measured by a transducer, according to some embodiments.

Referring now to FIG. 11, a graph 1100 illustrating an example relationship between a flow rate and a voltage measured by a transducer is shown, according to some embodiments. In some embodiments, graph 1100 is generated by a component of actuator 602 based on raw measurement data set 648 as described with reference to FIGS. 6A-6B. For example, graph 1100 may be generated by raw measurement manipulator 658 and/or flow rate calculator 662 of flow signal generator 650. In some embodiments, graph 1100 is provided by a manufacturer of transducers 634 such that flow rate calculator 662 can determine the flow rate based on voltage measurements provided by transducers 634. In some embodiments, voltage measurements are included in raw measurement data set 648 as provided by transducers 634.

Graph 1100 is shown to include a series 1102. Series 1102 can illustrate the example relationships between flow rate and voltage. It should be appreciated that the shape of series 1102 as shown in FIG. 11 is purely for sake of example. Series 1102 can take on any various shape depending on how transducers 634 measure aspects of a fluid. Series 1102 can illustrate how voltage increases as flow rate increases. For example, if the voltage is outputted based on a pressure exerted upon a transducer by the fluid, as the pressure increases (i.e., as the flow rate increases), the voltage may increase as well. As such, the exact shape of series 1102 can be based on how transducers 634 output data (e.g., as determined based on calibration settings of transducers 634). For example, increases in voltage may diminish as the flow rate increases. Advantageously, flow rate calculator 662 can utilize series 1102 to determine the flow rate based on voltages indicated by raw measurement data set 648. As described above, it should be appreciated that FIG. 11 is given purely for sake of example. Series 1102 can take on various shapes depending on how transducers 634 are implemented.

Figure 12:
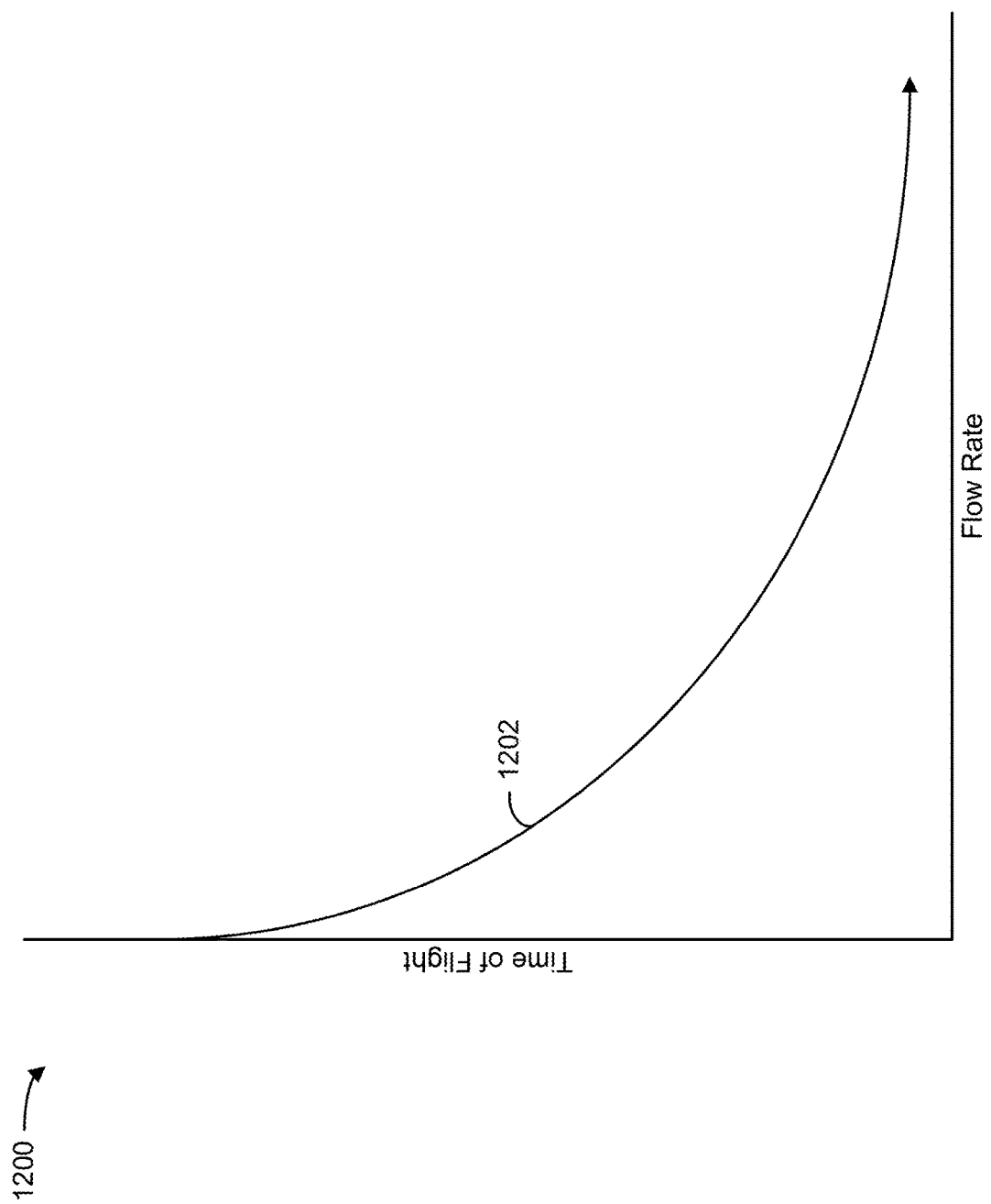
FIG. 12 is a graph illustrating an example relationship between a flow rate and a time of flight of ultrasonic waves, according to some embodiments.

Referring now to FIG. 12, a graph 1200 illustrating an example relationship between a flow rate and a time of flight of ultrasonic waves is shown, according to some embodiments. Graph 1200 is shown to include a series 1202 illustrating the time of flight as a function of the flow rate. In some embodiments, series 1202 is similar to series 1102 as described with reference to FIG. 11 in that series 1202 can be utilized to determine the flow rate by flow rate calculator 662 and may take on various shapes depending on calibrations of transducers 634. Graph 1200 can be provided by a manufacturer, generated based on previously gathered measurements, provided by a user, and/or obtained by another source. In particular, to determine the flow rate, flow rate calculator 662 can determine a time of flight based on raw measurements of raw measurement data set 648 and determine a flow rate associated with said time of flight. In this way, valve assembly 600 can be simplified as all calculations of flow rate are included within actuator 602. Utilization of series 1202 by flow rate calculator 662 can result in various benefits such as no additional sensors being needed, simplification of transducers 634 (e.g., transducers 634 do not need to perform processing), etc. It should be appreciated that FIG. 12 is given purely for sake of example. Series 1202 can take on various shapes depending on how transducers 634 are implemented.

Figure 13:
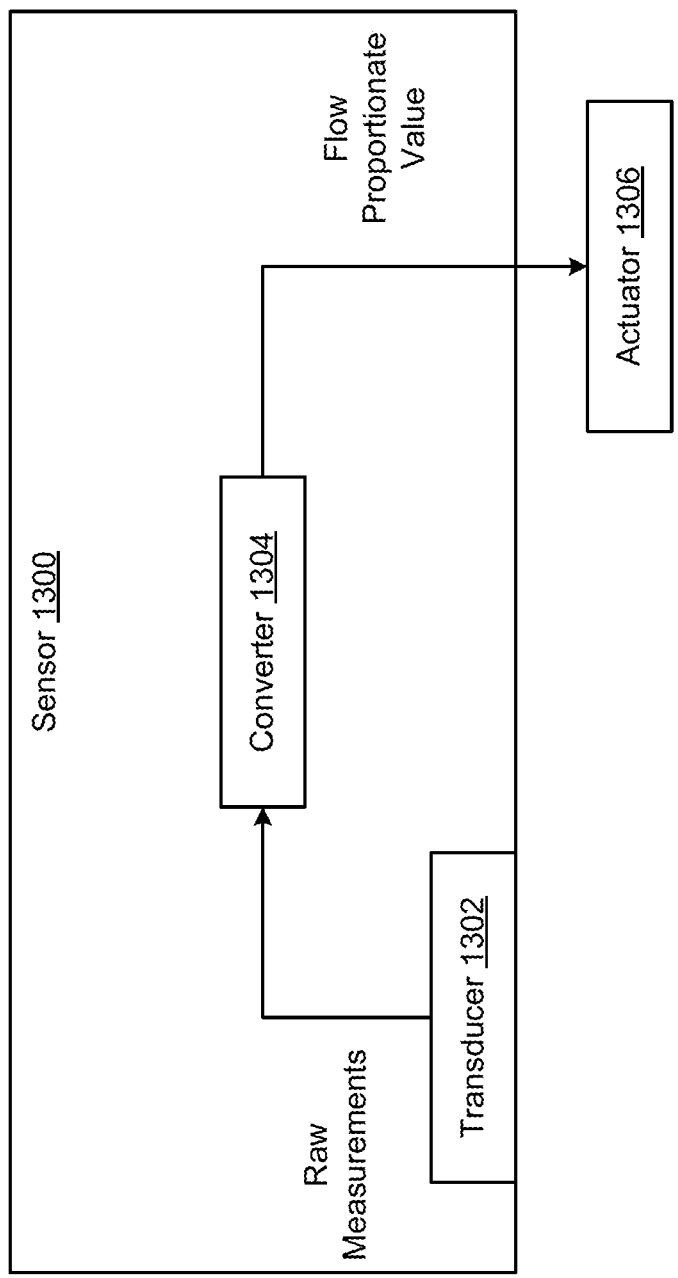
FIG. 13 is a block diagram of a traditional sensor for generating a flow proportionate value, according to some embodiments.

Referring now to FIG. 13, a block diagram of a traditional sensor 1300 for generating a flow proportionate value is shown, according to some embodiments. Sensor 1300 illustrates the typical complex sensor used in traditional systems. Specifically, sensor 1300 is shown to include a transducer 1302 and a converter 1304. In some embodiments, transducer 1302 includes multiple transducers 1302.

Sensor 1300 as illustrated in FIG. 13 particularly differs from valve assembly 500 as described with reference to FIG. 5. In valve assembly 500, transducers 510 are shown to be independent components within conduit 512 that provide raw measurements directly to actuator 502. However, as shown in FIG. 13, transducer 1302 is a component of sensor 1300 that provides raw measurements to converter 1304. Converter 1304 illustrates processing components that are inherent to sensors of traditional systems. Specifically, converter 1304 can be configured to generate a flow proportionate value based on the raw measurements. The raw measurements gathered by transducer 1302 may not be directly indicative of flow rate. As such, converter 1304 may include processing components to analyze the raw measurements, adjust the raw measurements based on calibration settings, adjust the raw measurements based on characteristics of a fluid measured by transducer 1302, etc.

As an example, if sensor 1300 is a pressure sensor, transducer 1302 may output voltage and/or current signals indicative of a pressure exerted on transducer 1302. These voltage and/or current signals, however, may not be useful alone as said signals do not account for a density of a fluid measured by transducer 1302, calibration settings of transducer 1302, etc. In other words, the voltage and/or current signals likely not proportionate to a flow rate of the fluid. As such, based on the raw measurements, converter 1304 can convert the raw measurements into a flow proportionate value indicative of pressure that is proportional to the flow rate. The pressure value can then be provided to an actuator 1306. In this sense, actuator 1306 is receiving a pre-processed value (i.e., the pressure value) as opposed to actuator 502 of FIG. 5 which is shown to directly receive raw measurements. An example of a relationship utilized by converter 1304 are described in detail below with reference to FIG. 14.

Requiring converter 1304 in sensor 1300 increases overall costs and complexity associated with a valve assembly as both sensor 1300 and an actuator 1306 may require processing components. This can result in more difficult maintenance for the valve assembly as multiple components perform processing and therefore more components may be prone to errors. As such, direct utilization of raw measurements as shown in valve assembly 500 may provide a variety of benefits over traditional systems.

Referring now to FIG. 14, a graph 1400 illustrating a relationship between voltage and flow rate generated by a traditional sensor is shown, according to some embodiments. More particularly, graph 1400 can illustrate how a voltage output of sensor 1300 (i.e., a flow proportionate value) as described with reference to FIG. 13 can be directly correlated to a flow rate. In other words, actuator 1306 can reference graph 1400 to determine a flow rate directly based on an output of sensor 1300.

Graph 1400 is shown to include a line 1402. Line 1402 can illustrate how a specific voltage outputted by sensor 1300 can be immediately correlated with a flow rate without additional processing. This differs from an output of transducers which may take on a variety of values and may require knowledge of fluid-specific properties (e.g., density, specific gravity, etc.) in order to convert the transducer output into a flow rate. Line 1402 can be utilized by an actuator to determine the flow rate directly based on an outputted voltage of sensor 1300 without any additional processing. In other words, the relationship illustrated by line 1402 may be established by processing components of sensor 1300 by accounting for fluid properties (e.g., density), transducer configurations, etc. and then utilized by the actuator to interpret an output of sensor 1300. Therefore, based on raw measurements provided by transducers, the processing components of sensor 1300 can output a voltage indicative of the flow proportionate value such that the actuator can have implicit knowledge of the flow rate based on the output voltage without requiring the actuator to have knowledge of fluid-specific properties such as density, specific gravity, etc.

Line 1402 is shown to be limited by a maximum voltage 1404. Maximum voltage 1404 can indicate a largest possible voltage value that can be outputted by sensor 1300. Maximum voltage 1404 is shown to be associated with a maximum flow 1406 which indicates a largest possible flow value that can be measured for a particular fluid. Maximum voltage 1404 and/or maximum flow 1406 can be determined based on calibration settings of the transducers and of sensor 1300. If, for example, the transducers are pressure transducers, sensor 1300 may determine a maximum pressure that the transducers can reasonably measure (e.g., based on provided specifications). Based on the maximum pressure, sensor 1300 can determine maximum flow 1406 respective of fluid characteristics, transducer configurations, etc. Maximum voltage 1404 can be determined as a maximum voltage that can be outputted by sensor 1300. In this way, a relationship (i.e., line 1402) can be established between maximum flow 1406 and maximum voltage 1404 such that an output of sensor 1300 can be directly indicative of a flow rate.

Referring now to FIG. 15, a graph 1500 illustrating various relationships between voltage and flow rate associated with transducer outputs is shown, according to some embodiments. As compared to graph 1400 as described with reference to FIG. 14, graph 1500 clarifies how the actuators, processing circuits, methods, etc. described throughout FIGS. 5-10 can directly leverage raw measurements outputted by transducers and do not require any pre-processing to be performed by a sensor and/or any other external processing components on the raw measurements.

Graph 1500 is shown to include a line 1502, a line 1504, and a line 1506. Lines 1502-1506 can illustrate that transducer outputs may adhere to a variety of relationships depending on fluid properties, transducer calibration, etc. When received by an actuator, transducer outputs may follow any of lines 1502-1506 and/or any other of a variety of relationships. Accordingly, the actuator may be required to perform processing on the raw measurements to determine how the raw measurements correlate to flow rate. Specifically, it may be the responsibility of the actuator to determine which of lines 1502-1506 (if any) describe a correlation between transducer outputs and flow rate. It should be noted that lines 1502-1506 are given purely for sake of example and are not meant to be limiting to relationships that may exist between transducer outputs and flow rate. For example, in an ultrasonic flow sensing system, the flow rate may be calculated based on time of flight of an ultrasonic signal emitted by an ultrasonic transducer, which is a flow disproportionate value.

A notable difference between the flow proportionate values shown in graph 1400 and the raw transducer output (i.e., flow disproportionate values) shown in graph 1500 is that each of the flow proportionate values always corresponds to the same flow rate value, regardless of the intensive properties of the fluid being measured. For example, a controller receiving a voltage value of $V_{max}$ as an output from sensor 1300 can determine that the fluid has a flow rate of $Flow_{max}$ using a fixed relationship between voltage and flow rate that does not depend on fluid density, viscosity, specific gravity, or any other intensive properties of the fluid being measured. Conversely, a controller receiving a raw measurement from a transducer (i.e., a flow disproportionate value) may require knowledge of fluid-specific properties such as density, specific gravity, etc. in order to convert the raw measurement into a flow value. The different lines 1502-1506 shown in graph 1500 show how the relationship between voltage and flow rate can differ depending on the fluid-specific properties. Accordingly, a controller receiving a raw measurement from a transducer may require knowledge of such fluid-specific properties in order to know which of the relationships defined by lines 1502-1506 to use to convert the raw measurement into a flow rate. But a controller receiving a flow proportionate value can use a single stored relationship (e.g., line 1402) to convert the flow proportionate value into a flow rate without requiring knowledge of any fluid-specific properties.

Configuration of Exemplary Embodiments

The construction and arrangement of the systems and methods as shown in the various exemplary embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. An actuator of an environmental control system of a building, the actuator comprising:
   a motor;
   a drive device driven by the motor and configured to drive a control device within a range of positions;
   a printed circuit board comprising one or more processing circuits configured to:
      obtain a raw measurement data set from one or more transducers;
      generate a flow signal based on the raw measurement data set, the flow signal indicating a flow rate of a fluid through a conduit;
      determine an actuator position setpoint based on a flow rate setpoint and the flow signal;
      operate the motor to drive the drive device to the actuator position setpoint;
      receive a feedback signal indicating an operating status of the motor;

determine if the operating status of the motor is within a range of expected values; and in response to a determination that the operating status of the motor is not within the range of expected values, initiate a corrective action;

wherein the motor, the drive device, and the printed circuit board are located within a common device chassis.

2. The actuator of claim 1, wherein the actuator further comprises a communications circuit configured to:
receive the flow rate setpoint from an external device; and
provide the flow rate setpoint to the one or more processing circuits.

3. The actuator of claim 1, wherein the one or more processing circuits are further configured to:
determine calibration settings of the one or more transducers, the calibration settings indicating one or more relationships between an output signal of the one or more transducers and the raw measurement data set;
wherein the flow signal is generated based on the calibration settings.

4. The actuator of claim 1, wherein the one or more transducers are configured to provide an output signal directly indicative of a received signal on the one or more transducers.

5. The actuator of claim 1, wherein the one or more processing circuits are further configured to:
generate processed data by performing one or more manipulations of the raw measurement data set;
wherein the flow signal is generated based on the processed data.

6. The actuator of claim 1, wherein the one or more processing circuits are further configured to:
select an equation for generating the flow signal based on at least one of:
a type of the one or more transducers;
calibration settings of the one or more transducers; or
a format of raw measurements of the raw measurement data set;
wherein the flow signal is generated based on the selected equation.

7. An environmental control system of a building, the environmental control system comprising:
an actuator comprising:
a motor; and
a drive device driven by the motor and configured to drive a control device within a range of positions;
a first printed circuit board comprising a first processing circuit configured to:
obtain a raw measurement data set from one or more transducers; and
generate a flow signal based on the raw measurement data set, the flow signal indicating a flow rate of a fluid through a conduit; and
a second printed circuit board comprising a second processing circuit configured to:
determine an actuator position setpoint based on a flow rate setpoint and the flow signal; and
operate the motor to drive the drive device to the actuator position setpoint;
wherein the motor, the drive device, the first printed circuit board, and the second printed circuit board are located within a single enclosure.

8. The environmental control system of claim 7, further comprising a communications circuit configured to:
receive the flow rate setpoint from an external device; and
provide the flow rate setpoint to at least one of the first processing circuit or the second processing circuit.

9. The environmental control system of claim 7, wherein the first processing circuit is further configured to:
determine calibration settings of the one or more transducers, the calibration settings indicating one or more relationships between an output signal of the one or more transducers and the raw measurement data set;
wherein the flow signal is generated based on the calibration settings.

10. The environmental control system of claim 7, wherein the one or more transducers are configured to provide an output signal directly indicative of a received signal on the one or more transducers.

11. The environmental control system of claim 7, wherein the first processing circuit is further configured to:
generate processed data by performing one or more manipulations of the raw measurement data set;
wherein the flow signal is generated based on the processed data.

12. The environmental control system of claim 7, wherein the second processing circuit is further configured to:
receive a feedback signal indicating an operating status of the motor;
determine if the operating status of the motor is within a range of expected values; and
in response to a determination that the operating status of the motor is not within the range of expected values, initiate a corrective action.

13. The environmental control system of claim 7, wherein the first processing circuit is further configured to:
select an equation for generating the flow signal based on at least one of:
a type of the one or more transducers;
calibration settings of the one or more transducers; or
a format of raw measurements of the raw measurement data set;
wherein the flow signal is generated based on the selected equation.

14. A method for operating a motor of an actuator, the method comprising:
obtaining, by one or more processing circuits of a printed circuit board, a raw measurement data set from one or more transducers;
generating, by the one or more processing circuits, a flow signal based on the raw measurement data set, the flow signal indicating a flow rate of a fluid through a conduit;
determining, by the one or more processing circuits, an actuator position setpoint based on a flow rate setpoint and the flow signal;
operating, by the one or more processing circuits, the motor of the actuator to drive a drive device of the actuator to the actuator position setpoint, wherein the motor, the drive device, and the printed circuit board are located within a common device chassis; and
selecting, by the one or more processing circuits, an equation for generating the flow signal based on at least one of:
a type of the one or more transducers;
calibration settings of the one or more transducers; or
a format of raw measurements of the raw measurement data set;
wherein the flow signal is generated based on the selected equation.

15. The method of claim 14, further comprising:
receiving, by a communications interface, the flow rate setpoint from an external device; and
providing, by the communications interface, the flow rate setpoint to at least one of the one or more processing circuits of the printed circuit board.

16. The method of claim 14, further comprising:
determining, by the one or more processing circuits, the calibration settings of the one or more transducers, the calibration settings indicating one or more relationships between an output signal of the one or more transducers and the raw measurement data set;
wherein the flow signal is generated based on the calibration settings.

17. The method of claim 14, wherein the one or more transducers are configured to provide an output signal directly indicative of a received signal on the one or more transducers.

18. The method of claim 14, further comprising:
generating, by the one or more processing circuits, processed data by performing one or more manipulations of the raw measurement data set;
wherein the flow signal is generated based on the processed data.

19. The method of claim 14, further comprising:
receiving, by the one or more processing circuits, a feedback signal indicating an operating status of the motor;
determining, by the one or more processing circuits, if the operating status of the motor is within a range of expected values; and
in response to a determination that the operating status of the motor is not within the range of expected values, initiating, by the one or more processing circuits, a corrective action.

* * * * *